US009803747B2

(12) United States Patent
Chaffee

(10) Patent No.: US 9,803,747 B2
(45) Date of Patent: *Oct. 31, 2017

(54) INFLATABLE DEVICE WITH RECESSED FLUID CONTROLLER AND SELF-SEALING VALVE

(71) Applicant: Robert B. Chaffee, Portland, ME (US)

(72) Inventor: Robert B. Chaffee, Portland, ME (US)

(*) Notice: Subject to any disclaimer, the term of this patent is extended or adjusted under 35 U.S.C. 154(b) by 59 days.

This patent is subject to a terminal disclaimer.

(21) Appl. No.: 14/242,167

(22) Filed: Apr. 1, 2014

(65) Prior Publication Data

US 2014/0208735 A1    Jul. 31, 2014

Related U.S. Application Data

(63) Continuation of application No. 12/752,732, filed on Apr. 1, 2010, now Pat. No. 8,684,030.

(60) Provisional application No. 61/166,162, filed on Apr. 2, 2009.

(51) Int. Cl.
*F16K 15/20* (2006.01)
*F16H 61/4061* (2010.01)
*A47C 27/08* (2006.01)

(52) U.S. Cl.
CPC ....... *F16H 61/4061* (2013.01); *A47C 27/082* (2013.01); *F16K 15/202* (2013.01); *Y10T 137/3584* (2015.04); *Y10T 137/7839* (2015.04); *Y10T 137/7876* (2015.04); *Y10T 137/86019* (2015.04); *Y10T 137/86027* (2015.04)

(58) Field of Classification Search
USPC .................................................. 137/565.15
See application file for complete search history.

(56) References Cited

U.S. PATENT DOCUMENTS

| 2,168,774 A | 8/1939 | Hurlburt |
| 2,285,324 A | 6/1942 | Bennett |
| 2,459,689 A | 1/1949 | Dickey et al. |
| 2,767,735 A | 10/1956 | Darling |

(Continued)

FOREIGN PATENT DOCUMENTS

| CN | 101219024 A | 7/2008 |
| JP | 58-53965 | 4/1983 |

(Continued)

OTHER PUBLICATIONS

International Search Report from PCT Application No. PCT/US2010/029678 dated Jun. 3, 2010.

(Continued)

*Primary Examiner* — John Fox
(74) *Attorney, Agent, or Firm* — Lando & Anastasi, LLP

(57) ABSTRACT

A fluid controller comprising a housing separating an interior of the housing from an inflatable bladder is disclosed, the fluid controller including a plurality of valves fluidly coupling the interior of the housing to the inflatable bladder through a respective opening in the housing, a pump located at least partly within an interior of the housing, wherein the plurality of valves and respective orifices are configured to provide a fluid path between the interior of the housing and the inflatable bladder during inflation of the inflatable bladder, and wherein a valve and respective orifice is biased open to provide a fluid path between the interior of the housing and the inflatable bladder for fluid release.

20 Claims, 19 Drawing Sheets

(56) References Cited

U.S. PATENT DOCUMENTS

| | | | |
|---|---|---|---|
| 3,095,901 A | 7/1963 | Larson et al. | |
| 3,112,502 A | 12/1963 | Forsburg | |
| 3,459,363 A | 8/1969 | Miller | |
| 3,665,958 A | 5/1972 | Dunkelis | |
| 3,719,401 A | 3/1973 | Peruglia | |
| 4,175,297 A | 11/1979 | Robbins et al. | |
| 4,273,310 A | 6/1981 | Ginzler | |
| 4,862,533 A | 9/1989 | Adams, III | |
| 4,890,344 A | 1/1990 | Walker | |
| 4,911,405 A | 3/1990 | Weissgerber | |
| 4,948,092 A | 8/1990 | Kasper et al. | |
| 4,986,738 A | 1/1991 | Kawasaki et al. | |
| 4,990,060 A | 2/1991 | Cheng-Chung | |
| 5,037,062 A | 8/1991 | Neuhaus | |
| 5,267,363 A | 12/1993 | Chaffee | |
| 5,367,726 A | 11/1994 | Chaffee | |
| 5,494,258 A | 2/1996 | Weissgerber et al. | |
| 5,503,618 A | 4/1996 | Rey | |
| 5,509,154 A | 4/1996 | Shafer et al. | |
| 5,590,428 A * | 1/1997 | Roter | A47C 27/081 297/180.13 |
| 5,606,756 A | 3/1997 | Price | |
| 5,745,942 A | 5/1998 | Wilkerson | |
| 5,904,172 A | 5/1999 | Gifft et al. | |
| 6,129,524 A | 10/2000 | Woollenweber et al. | |
| 6,164,314 A | 12/2000 | Saputo et al. | |
| 6,206,654 B1 | 3/2001 | Cassidy | |
| 6,237,621 B1 | 5/2001 | Chaffee | |
| 6,237,653 B1 | 5/2001 | Chaffee | |
| 6,302,145 B1 | 10/2001 | Ellis et al. | |
| 6,332,760 B1 | 12/2001 | Chung | |
| 6,439,264 B1 | 8/2002 | Ellis et al. | |
| 6,530,751 B1 | 3/2003 | Song et al. | |
| 6,543,073 B2 | 4/2003 | Wu | |
| 6,679,686 B2 | 1/2004 | Wang | |
| 6,709,246 B2 | 3/2004 | Boyd | |
| 6,715,172 B2 | 4/2004 | Leventhal et al. | |
| 6,793,469 B2 | 9/2004 | Chung | |
| 6,836,914 B1 | 1/2005 | Tsai | |
| 6,955,527 B2 | 10/2005 | Yen | |
| 7,039,972 B2 | 5/2006 | Chaffee | |
| 7,246,393 B2 | 7/2007 | Westendorf et al. | |
| 7,475,440 B2 | 1/2009 | Chaffee | |
| 7,588,425 B2 | 9/2009 | Chung | |
| 7,739,763 B2 | 6/2010 | Wang et al. | |
| 8,210,834 B2 | 7/2012 | Tsai | |
| 8,684,030 B2 | 4/2014 | Chaffee | |
| 2001/0026763 A1 | 10/2001 | Chung | |
| 2002/0194678 A1 | 12/2002 | Chung | |
| 2003/0003001 A1 | 1/2003 | Chaffee | |
| 2003/0024050 A1 | 2/2003 | Boso et al. | |
| 2003/0099560 A1 | 5/2003 | Wang | |
| 2003/0215340 A1 | 11/2003 | Chung | |
| 2004/0037717 A1 | 2/2004 | Wang | |
| 2004/0089835 A1 | 5/2004 | Schreiner | |
| 2004/0168256 A1 * | 9/2004 | Chaffee | A47C 27/082 5/713 |
| 2005/0118046 A1 | 6/2005 | Wang | |
| 2005/0186097 A1 | 8/2005 | Wang | |
| 2006/0053561 A1 | 3/2006 | Metzger et al. | |
| 2006/0162779 A1 | 7/2006 | Chaffee | |
| 2008/0109962 A1 | 5/2008 | Wang et al. | |

FOREIGN PATENT DOCUMENTS

| | | |
|---|---|---|
| JP | 61-126241 | 6/1986 |
| JP | 0714273 | 3/1995 |
| JP | 2005-524805 A | 8/2005 |
| JP | 2007-159981 A | 6/2007 |
| WO | 9803810 A1 | 1/1998 |
| WO | 0040882 A1 | 7/2000 |
| WO | 0187121 A2 | 11/2001 |
| WO | 03093709 A1 | 11/2003 |

OTHER PUBLICATIONS

Patent Examination Report No. 1 for Australian Patent Application No. 2010232594, dated May 16, 2013, 5 pages.

The Extended European Search Report for European Patent Application No. EP 10759427.7 dated Feb. 7, 2013, 5 pages.

* cited by examiner

INFLATABLE DEVICE WITH RECESSED FLUID CONTROLLER AND SELF-SEALING VALVE

BACKGROUND

Field of the Application

The application is related to inflatable devices, and, more specifically, to an inflatable device with a fluid controller comprising a pump and self-sealing valve.

SUMMARY

According to one aspect of the present invention, a self-sealing valve is provided. The self-sealing valve comprises a valve housing having a fluid conduit, a valve seat, and a retaining member, the valve housing being configured to pass fluid through the fluid conduit, and a flexible diaphragm comprising a flexible material having resiliency, wherein the retaining member and the flexible diaphragm are configured so that the retaining member retains a portion of the flexible diaphragm so as to use the resiliency of the flexible material to bias the flexible diaphragm against the valve seat to a closed position of the self-sealing valve to provide a self-seal of the fluid conduit, and to facilitate movement of the flexible diaphragm under a fluid bias against a first side of the flexible diaphragm in a first direction away from the valve seat to an open position, and wherein the retaining member and the flexible diaphragm are configured so that the self-sealing valve can be contacted to move a portion of the flexible diaphragm away from the valve seat to the open position.

In one embodiment, the self-sealing valve may further comprise a container having an interior, an exterior, a wall separating the interior and the exterior, and a port in the wall for transferring fluid between the interior and the exterior, and wherein the valve housing is attached to the wall of the container so that fluid being transferred between the interior and the exterior of the container passes through the fluid conduit of the valve housing. In this embodiment, the valve housing, the retaining member and the diaphragm may be arranged so that an act of fluid injection of sufficient pressure into the container causes the diaphragm to move in the first direction into the open position to permit an influx of fluid into the container.

In another embodiment, the self-sealing valve may further comprise a locking tab that is constructed to allow the diaphragm to be placed into a locked open position. In this embodiment, the locking tab may be configured so that it can be contacted to release the self-sealing valve from the locked open position.

In yet another embodiment, the valve housing, the retaining member and the diaphragm are arranged to provide non-axial movement of the diaphragm in a direction not substantially along an axis of the fluid inlet, in the first direction and in a second direction. In another embodiment, the valve housing, the retaining member and the diaphragm may be arranged to provide a high volume of fluid transfer over a low pressure range through the fluid conduit. In still another embodiment, the flexible diaphragm may be retained by the retaining member so that substantially no structure exists under the flexible diaphragm. In another embodiment, the valve housing, the retaining member, and the flexible diaphragm may be arranged so that the flexible diaphragm must be directly contacted to move the part of the periphery of the flexible diaphragm away from the valve seat. In yet another embodiment, the retaining member and the flexible diaphragm may be configured so that only a portion of the flexible diaphragm is moved under the fluid bias against the first side of the flexible diaphragm in a first direction away from the valve seat to an open position. In another embodiment, the retaining member and the flexible diaphragm may be arranged so that only a portion of the flexible diaphragm is moved away from the valve seat in a first direction away from the valve seat to an open position in response to the contacting the flexible diaphragm.

According to another aspect of the present invention, an inflatable device is provided. The inflatable device comprises a substantially fluid impermeable bladder, a fluid controller comprising an electrically powered pump, the fluid controller being coupled at least partially to a wall of the substantially fluid impermeable bladder in a mounted position and orientation at least partially within a profile of the substantially fluid impermeable bladder so that a portion of the fluid controller is accessible from an exterior of the substantially fluid impermeable bladder, and in the same mounted position and orientation of the fluid controller, the fluid controller being adapted to permit air to exit the substantially fluid impermeable bladder through the fluid controller and to be provided to the substantially fluid impermeable bladder through the fluid controller, the fluid controller further comprising a self-sealing valve comprising a valve housing having a fluid conduit, a valve seat, and a retaining member, the valve housing being configured to pass fluid through the fluid conduit, and a flexible diaphragm comprising a flexible material having resiliency. The retaining member and the flexible diaphragm are configured so that the retaining member retains a portion of the flexible diaphragm so as to use the resiliency of the flexible material to bias the flexible diaphragm against the valve seat to a closed position of the self-sealing valve to provide a self-seal of the fluid conduit, and to facilitate movement of the flexible diaphragm under a fluid bias against a first side of the flexible diaphragm in a first direction away from the valve seat to an open position. The retaining member and the flexible diaphragm are configured so that the self-sealing valve can be contacted to with an electro-mechanical actuator move a portion of the flexible diaphragm away from the valve seat to the open position.

In one embodiment, the fluid controller may be constructed and arranged such that a majority of the fluid controller is positioned within the profile of the substantially fluid impermeable bladder. In this embodiment, the fluid controller may be constructed and arranged such that substantially all of the fluid controller is positioned within the profile of the substantially fluid impermeable bladder.

In another embodiment, the fluid controller may comprise a housing that is coupled to a wall of the substantially fluid impermeable bladder. In this embodiment, the housing may include a muffler structure configured to reduce an operating noise level of the fluid controller. In this embodiment, the housing may be an outer housing, and the fluid controller may further comprise an inner housing at least partially surrounding the electrically powered pump, wherein the outer housing and the inner housing define a housing fluid conduit therebetween. The housing fluid conduit may include at least one vane structure for directing fluid flow within the housing fluid conduit.

In yet another embodiment, the fluid controller comprises a flange impermeably connected to the substantially fluid impermeable bladder. In this embodiment, the wall of the bladder may comprise a fluid impermeable wall that connects to a housing of the fluid controller.

In another embodiment, the inflatable device may further comprise a remote control, including a first switch electrically connecting the pump and a power source such that the first switch may selectively energize the pump by actuation of the first switch, and a second switch electrically connecting the power source and the electro-mechanical device, such that upon actuation of the second switch, the electro-mechanical device acts upon the self-valve to selectively open the self-sealing valve. In this embodiment, the electro-mechanical device may comprise a solenoid.

In still another embodiment, the self-sealing valve may comprise a member connected to the valve that is configured to be acted upon by the electro-mechanical device to move the self-sealing valve between the open and closed position.

In another embodiment, the substantially fluid impermeable bladder is shaped and sized so as to form a mattress.

In yet another embodiment, the fluid impermeable bladder may further comprise an exhaust valve through which air is exhausted quickly from the substantially fluid impermeable bladder. In still another embodiment, the self-sealing valve is a first self-sealing valve, the fluid controller further comprising a second self-sealing valve comprising a valve housing having a fluid conduit, a valve seat, and a retaining member, the valve housing being configured to pass fluid through the fluid conduit, and a flexible diaphragm comprising a flexible material having resiliency.

According to another aspect of the present invention, an inflatable system is provided. The inflatable system comprises a substantially fluid impermeable bladder, and a fluid controller comprising a self-sealing valve comprising a valve housing having a fluid conduit, a valve seat, and a retaining member, the valve housing being configured to pass fluid through the fluid conduit, and a flexible diaphragm comprising a flexible material having resiliency, wherein the retaining member and the flexible diaphragm are configured so that the retaining member retains a portion of the flexible diaphragm so as to use the resiliency of the flexible material to bias the flexible diaphragm against the valve seat to a closed position of the self-sealing valve to provide a self-seal of the fluid conduit, and to facilitate movement of the flexible diaphragm under a fluid bias against a first side of the flexible diaphragm in a first direction away from the valve seat to an open position, and wherein the retaining member and the flexible diaphragm are configured so that the self-sealing valve can be contacted to move a portion of the flexible diaphragm away from the valve seat to the open position, a pump in fluid communication with the substantially fluid impermeable bladder through the self-sealing valve, the fluid controller being disposed in a mounted position and orientation to the substantially fluid impermeable bladder at least partially within a profile of the substantially fluid impermeable bladder and so that a portion of the fluid controller is accessible from an exterior of the substantially fluid impermeable bladder, and in the same mounted position and orientation of the fluid controller, the fluid controller being adapted to permit air to exit the substantially fluid impermeable bladder through the self-sealing valve and to be provided to the substantially fluid impermeable bladder through the fluid controller and self-sealing valve, and a remote controller including a first switch electrically coupling an electromechanical device and a power source, the electromechanical device being electro-mechanically coupled to the self-sealing valve, the first switch and the electromechanical device being configured and arranged in combination so that upon actuation of the first switch, the electromechanical device is energized so as to electro-mechanically actuate the self-sealing valve to selectively open the self-sealing valve.

In one embodiment, the remote controller further comprises a second switch having a first position and a second position that couples the pump and the power source, and that is configured to selectively energize the pump by actuation of the second switch to one of the first and second positions. In one embodiment, the pump is an AC powered pump. In yet another embodiment, the pump is DC powered pump. In a number of embodiments, a majority of the fluid controller is positioned within the profile of the substantially fluid impermeable bladder.

In another embodiment, substantially all of the fluid controller is positioned within the profile of the substantially fluid impermeable bladder. In yet another embodiment, the fluid controller includes a housing and the housing includes a flange that connects to the substantially fluid impermeable bladder. In this embodiment, the housing may further include a muffler structure configured to reduce an operating noise level of the fluid controller. In this embodiment, the housing may be an outer housing, and the fluid controller may further comprise an inner housing at least partially surrounding the electrically powered pump, wherein the outer housing and the inner housing define a housing fluid conduit therebetween. The housing fluid conduit may include at least one vane structure for directing fluid flow within the housing fluid conduit. In a further embodiment, the inner housing is configured to accommodate a plurality of electrically powered pumps each housing a different size, respectively. According to one embodiment, the term size as used here refers to physical dimensions, while in another embodiment size refers to the horsepower rating or the air flow rating (for example, CFM) of the pump. In still another embodiment, the substantially fluid impermeable bladder is sized and shaped so as to form a mattress. In yet another embodiment, the self-sealing valve is a first self-sealing valve, the fluid controller further comprising a second self-sealing valve comprising a valve housing having a fluid conduit, a valve seat, and a retaining member, the valve housing being configured to pass fluid through the fluid conduit, and a flexible diaphragm comprising a flexible material having resiliency.

In accordance with a further aspect of the invention, fluid controller is configured to supply fluid to a bladder including a first chamber. According to one embodiment, the fluid controller includes a housing, a pump located at least partly within an interior of the housing and a plurality of self-sealing valves fluidly coupling an interior of the housing to the first chamber. In one embodiment, a pump is configured to provide fluid to the first chamber and at least two of the plurality of self-sealing valves are biased open to provide a fluid path between the interior of the housing and the first chamber during inflation of the first chamber. In accordance with a further embodiment, at least one of the plurality of self-sealing valves is biased open to provide a fluid path between the interior of the housing and the first chamber to release fluid from the first chamber. In addition, in some embodiments, at least one of the plurality of self-sealing valves is employed to release fluid from the first chamber and is also included in the at least two of the plurality of self-sealing valves employed during inflation of the first chamber.

In accordance with yet another embodiment, the housing includes a wall separating the interior of the housing from the first chamber and the wall includes a plurality of orifices each configured to be sealed by one of the plurality of self-sealing valves, respectively. In a further embodiment, a first plurality of orifices included in the plurality of orifices are employed during inflation and a single orifice included in the plurality of orifices is employed for fluid release. According to one embodiment, the fluid controller is employed to release fluid from the chamber for comfort control. According to another embodiment, the fluid controller is employed to release fluid from the chamber for deflation without aid of the pump while in another embodiment, the pump is operated to assist in the withdrawal of fluid from the chamber (for example, in a power deflate operation).

In a further aspect of the invention, a fluid controller is configured to adjust fluid pressure in an inflatable comfort device including an inflatable bladder. In accordance with some embodiments, the fluid controller includes a housing, a pump located at least partly within an interior of the housing and configured to provide fluid to the inflatable bladder, and a plurality of valves fluidly coupling an interior of the housing to the bladder. In accordance with some embodiments, the housing includes a housing wall including the plurality of openings each associated with one of the plurality of valves, respectively, and each opening defines a cross-sectional area of a fluid pathway from the interior of the housing to the bladder, respectively. In accordance with some embodiments, a total cross-sectional area provided by at least one opening selected from the plurality of openings for use during inflation is greater than a total cross-sectional area provided by at least one opening selected from the plurality of openings for use during deflation.

In accordance with some embodiments, at least one opening selected for use during inflation includes at least two openings each associated with one of the plurality of valves, respectively.

In yet another embodiment, a ratio of the total cross-sectional area for use during inflation to the total cross-sectional area for use during deflation is substantially 2:1. In accordance with another embodiment, the ratio is substantially 3:1.

According to a further aspect, a fluid controller is configured to adjust fluid pressure in an inflatable comfort device including an inflatable bladder where the fluid controller includes a housing including a housing wall having at least one opening fluidly coupling an interior of the housing to an interior of the bladder, the at least one opening defining a cross-sectional area of a fluid pathway from the interior of the housing to the interior of the bladder, at least one valve configured to seal the at least one opening when the inflatable bladder is pressurized with fluid, and a pump located at least partly within an interior of the housing and configured to provide fluid to the inflatable bladder. According to one embodiment, the total cross-sectional area provided by the at least one valve in combination with the at least one opening during inflation is substantially different from a total cross-sectional area provided by the at least one valve in combination with the at least one opening during deflation.

BRIEF DESCRIPTION OF DRAWINGS

The foregoing and other advantages of the application will be more fully appreciated with reference to the following drawings in which.

DETAILED DESCRIPTION

Figure 1:
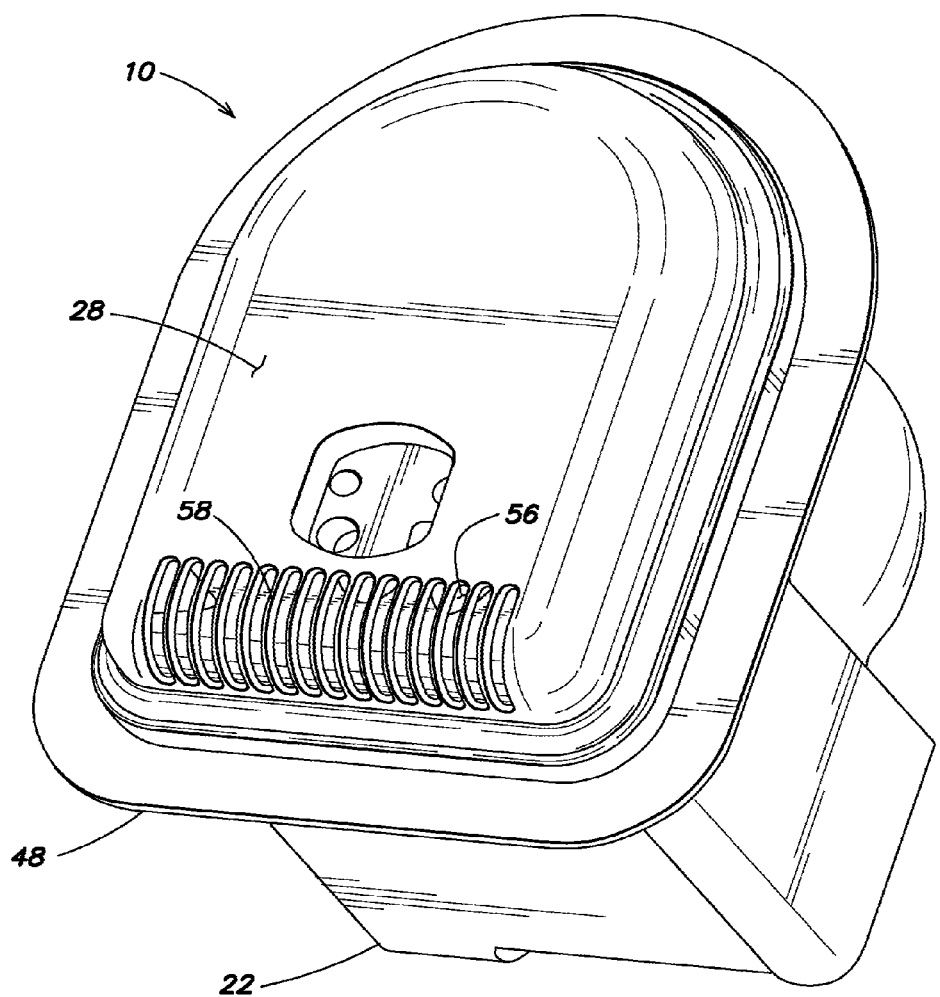
FIG. 1 is a perspective view of a fluid controller according to one embodiment.

The application is directed to an inflatable device with a recessed fluid controller and self-sealing valve. As used herein, a fluid controller is a device capable of regulating fluid flow to and from an inflatable device and may include various components, such as a housing, a self-sealing valve, a fluid conduit, a motor and impeller, a valve actuator, a power connector, inlet and outlet ports, and the like. In one embodiment, the application is directed to an inflatable device including a substantially fluid impermeable bladder and a fluid controller substantially positioned within the bladder.

As used herein, the term "recess" is defined as an indentation. For example, a recess in a bladder may comprise an indentation in a wall of the bladder, in which an object (e.g., a fluid controller) may be located. In addition, a recess may include a socket in a wall of the bladder in which a fluid controller is disposed.

As used herein, an object "positioned within" a bladder occupies a portion of the volume that would normally be occupied by the bladder, but is not completely enclosed within the bladder. It is also to be appreciated that though the fluid controller is described as being located within a wall of the bladder, it need not be directly connected to a wall of the bladder. For example, a fluid controller can be located within a recess in the wall of a bladder and be "positioned within" the bladder, as this term is defined and used herein.

The term "profile of a bladder" is defined herein as an outermost outline of the bladder, exclusive of any irregularities.

The term "chamber" as used herein is defined as all or a part of an interior of a fluid impermeable bladder where all portions of the chamber are fluidly coupled to one another such that independent adjustment of fluid pressure in separate portions (or sections) of the chamber is unavailable. In one embodiment, independent adjustment of the fluid pressure within regions of a chamber is unavailable and an adjustment of fluid pressure (i.e., by inflation or deflation) in any region of the chamber equally effects the fluid pressure in all regions of the chamber. Accordingly, in one embodiment, a chamber can include only one interior region of the bladder. According to other embodiments, a bladder provides a single chamber having multiple regions separated by baffles or other structure that remain fluidly coupled such that independent pressure adjustment of the various regions is not available. In some embodiments, a single fluid impermeable bladder can be configured to provide multiple separate chambers such that independent pressure adjustment of a first chamber is available relative to adjustment of a second chamber included in the fluid impermeable bladder.

It is also to be appreciated that although a mattress is a type of inflatable device for which the fluid controller and self-sealing valve of the present invention may be used, the fluid controller and self-sealing valve may be used with any other type of inflatable device such as, for example; inflatable furniture or sporting items such as chairs, mattresses and pillows; inflatable safety devices such as life preservers, barriers, bumpers, and pads; inflatable medical devices such as supports, casts and braces; inflatable luggage devices such as padding and luggage lining materials; inflatable recreational devices such as swimming aids, floats, tubes and rings; inflatable vehicles and vehicle components such as boats, rafts and tires; inflatable support structures such as buildings, portable enclosures, platforms, ramps and the like.

Figure 2:
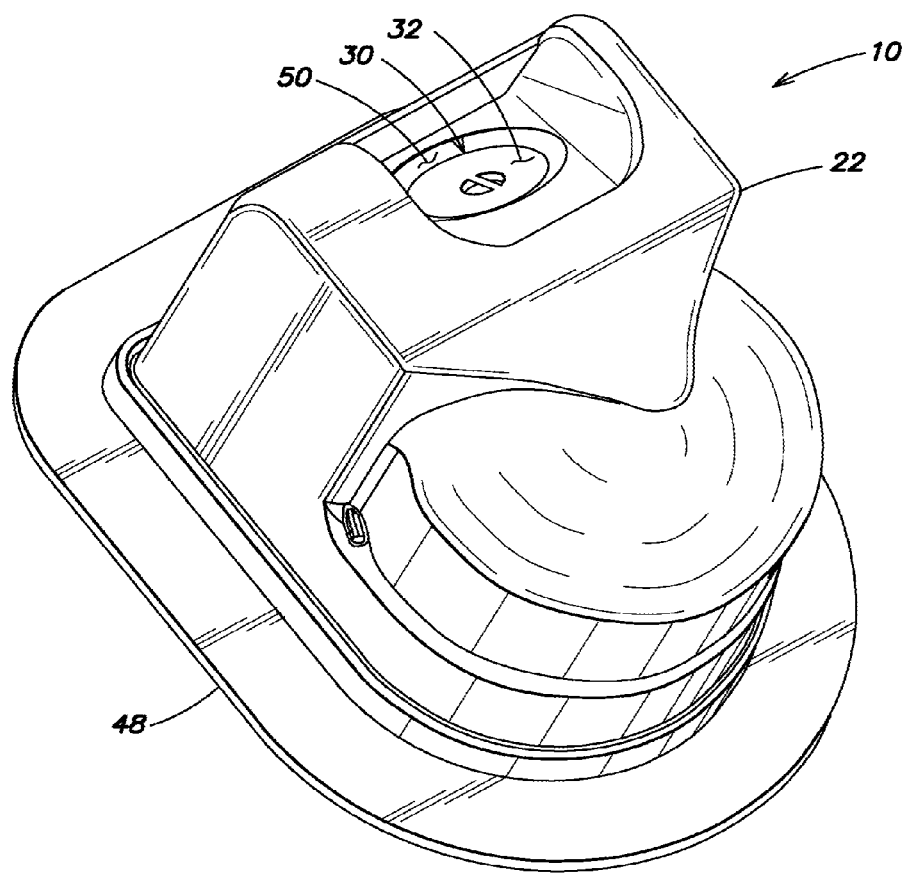
FIG. 2 is a bottom, perspective view of a fluid controller according to one embodiment.

Referring first to FIGS. 1 and 2, one embodiment of a fluid controller 10 including a self-sealing valve 30 will be described by way of example. It is to be appreciated that the fluid controller 10 can be used with any inflatable device having a substantially fluid impermeable bladder that can be configured with a recessed fluid controller 10 at least partly positioned within the bladder. The bladder (not shown) may be constructed in any manner and of any material or materials capable of retaining a desired fluid under a degree of pressure necessary for its intended application. For example, the bladder may be constructed of a substantially fluid impermeable barrier and may be shaped in accordance with its intended use. For example, where the bladder is intended for use as a mattress, it can be constructed in the shape and thickness of a conventional mattress. In addition, the bladder may include internal structure, such as ribs or partitions. Further, the bladder may be divided into two or more separate fluid containing compartments. The bladder may also include internal structure to control the movement of fluid within the bladder. For example, the bladder may include baffles or walls (not shown) within the bladder to improve the flow of fluid when the bladder is inflated or deflated.

In some embodiments, the bladder may have an exhaust port (not shown) that is separate from the fluid controller. The exhaust port can be opened by the user to facilitate deflation of the bladder, and can be closed in a fluid-tight manner during inflation and use.

A wall of the bladder may be any thickness required to substantially contain a fluid under pressures at which the bladder will be used. The thickness of the wall of the bladder may depend upon the characteristics of the material from which the bladder is constructed. The bladder may be constructed of any material or materials capable of substantially containing a fluid and forming a bladder strong enough to withstand the fluid pressure at which the bladder is to be used, as well as any external pressures that might be encountered in normal use, such as the weight of one or more persons should the bladder be used as a mattress. In some embodiments, the bladder may be constructed from a relatively inexpensive, easy to work with, and durable material. For example, the bladder may be constructed of a polymeric material, such as a thermoplastic. Some example materials include polyvinyl chloride (PVC) film and polyester. In some embodiments, the material is chosen based on non-allergenic or other health or environmental considerations. The manner of making the bladder may depend on its material of construction and configuration, as will be recognized by one of ordinary skill in the art.

The bladder may also include additional materials to improve the utility and comfort of the bladder. For example, the bladder may include outer layers or coatings (not shown) for durability, support or comfort. In some embodiments, the bladder may be coated with a material that is more pleasant to the touch than the material from which the bladder is constructed. Where it is for use in supporting a person, the bladder may also include a layer to provide additional comfort, particularly where the person is to contact the bladder. For example, the bladder may include a comfort layer (not shown) made of material for improving the texture and feel of the bladder, such as velvet or other tufted or non-tufted fabric.

Figure 3:
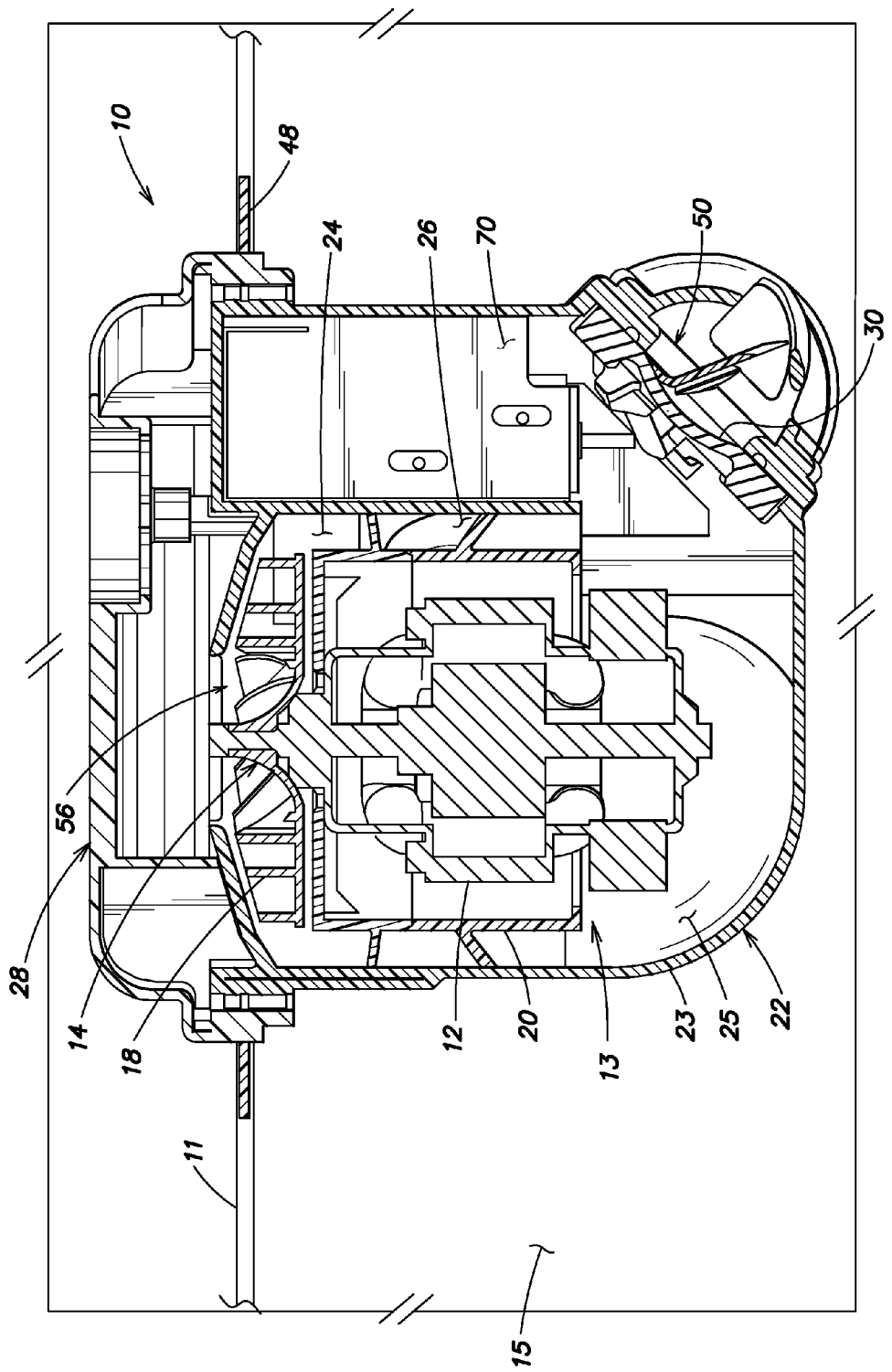
FIG. 3 is a cross-sectional view of the fluid controller including the self-sealing valve and valve actuator, according to one embodiment.
Figure 4:
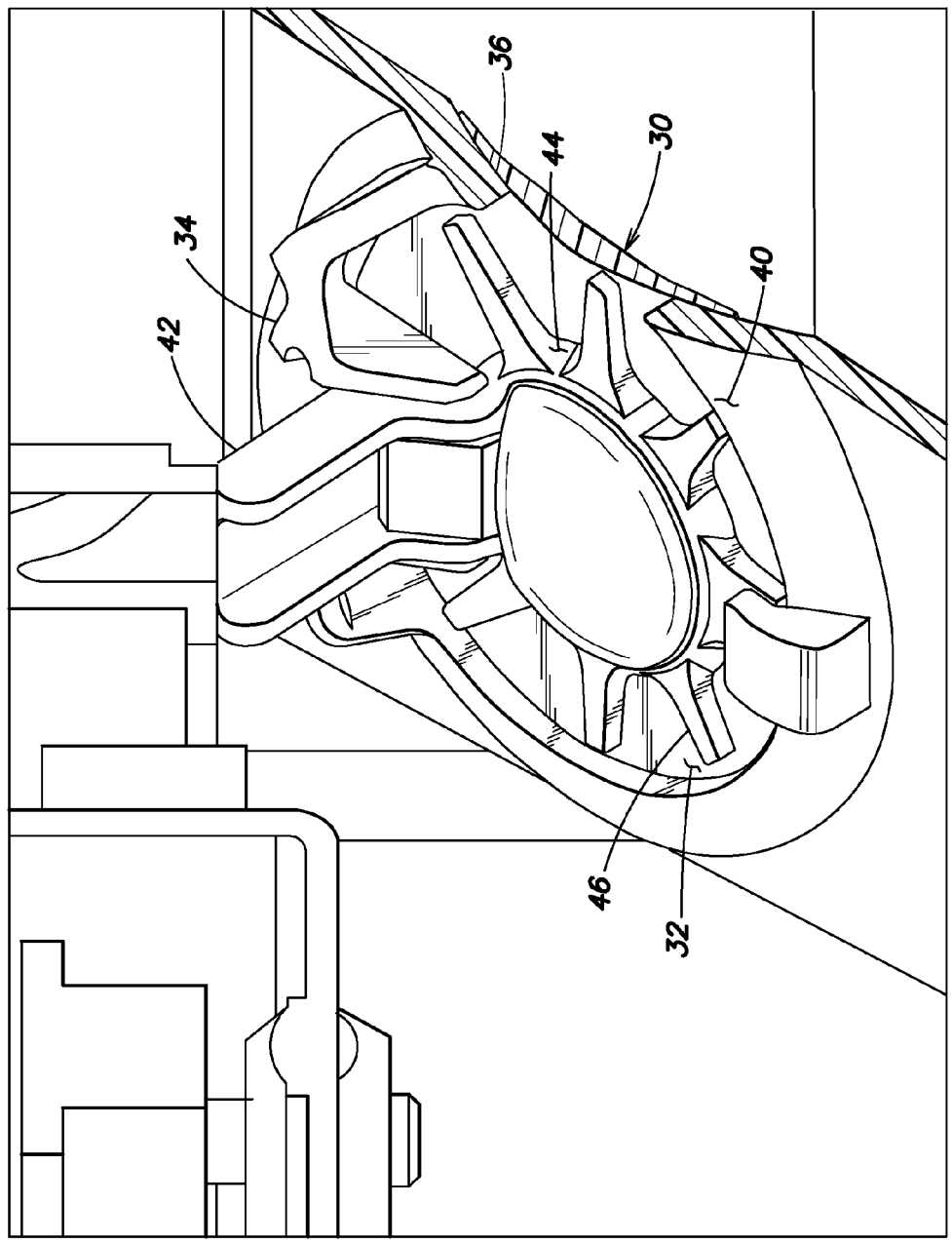
FIG. 4 is a front, perspective view of a self-sealing valve of the fluid controller, according to one embodiment.
Figure 5:
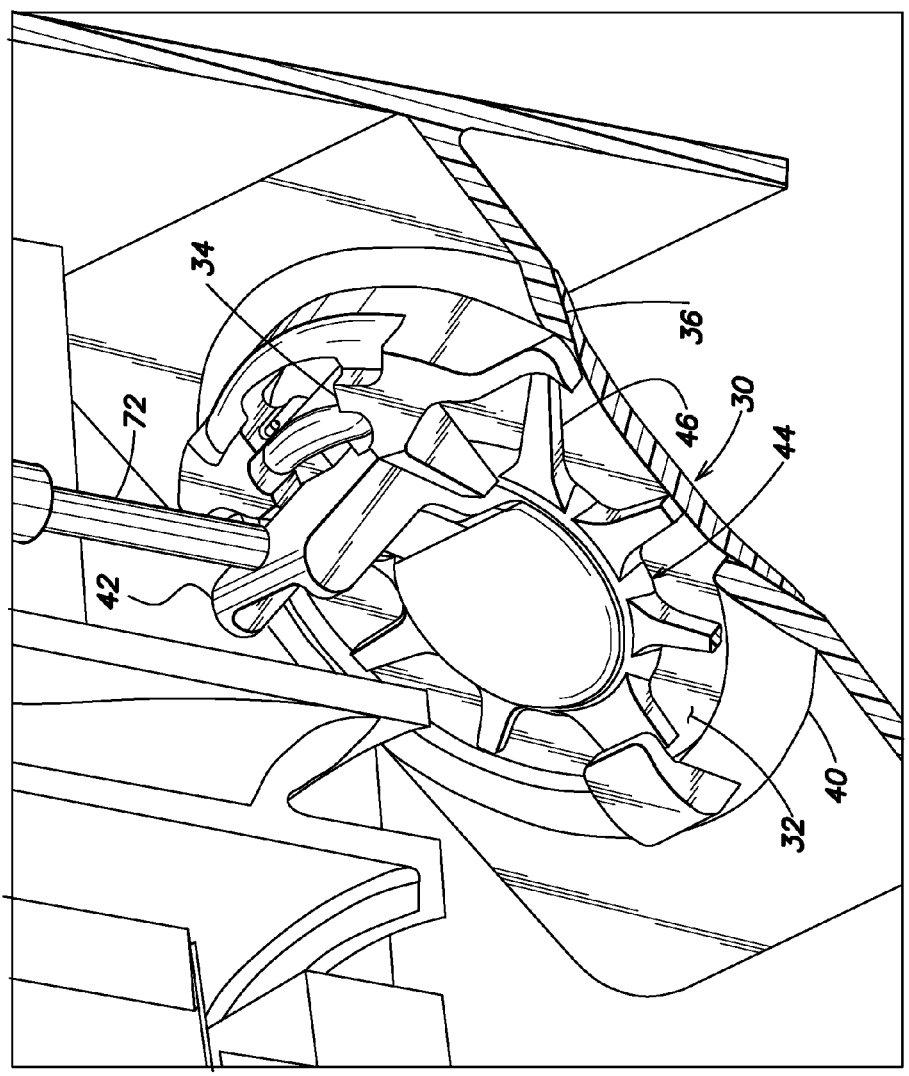
FIG. 5 is a perspective view of a self-sealing valve and actuator of the fluid controller, according to one embodiment.
Figure 6:
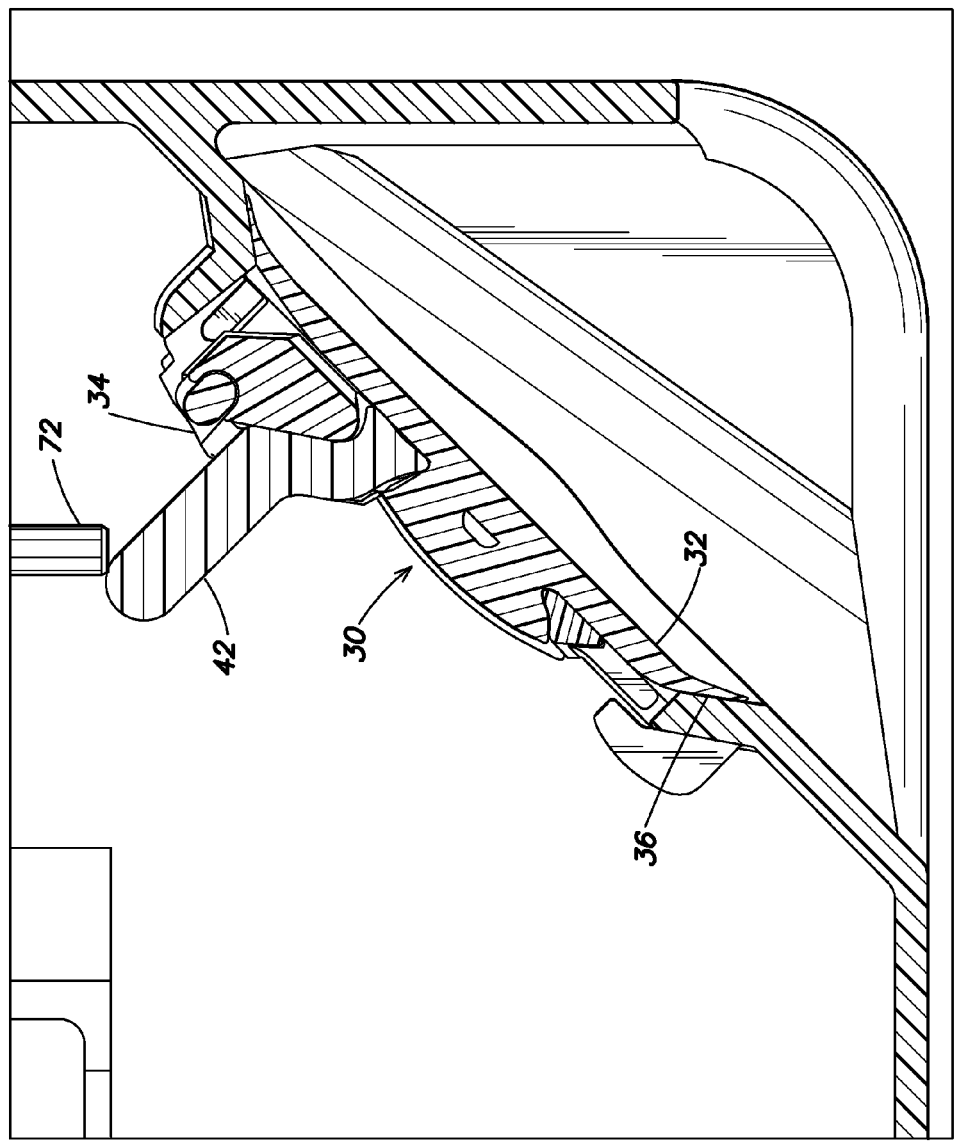
FIG. 6 is a cross sectional view of the self-sealing valve and actuator of FIG. 5.
Figure 7:
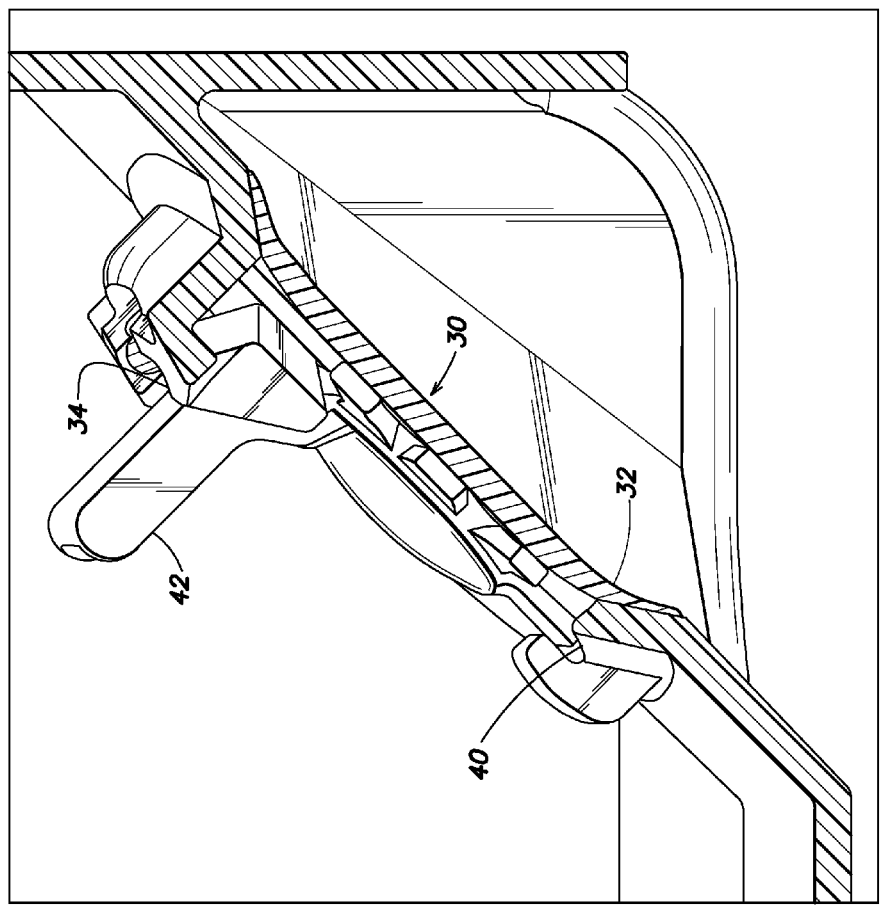
FIG. 7 is a side view of a self-sealing valve of the fluid controller, according to one embodiment.
Figure 8:
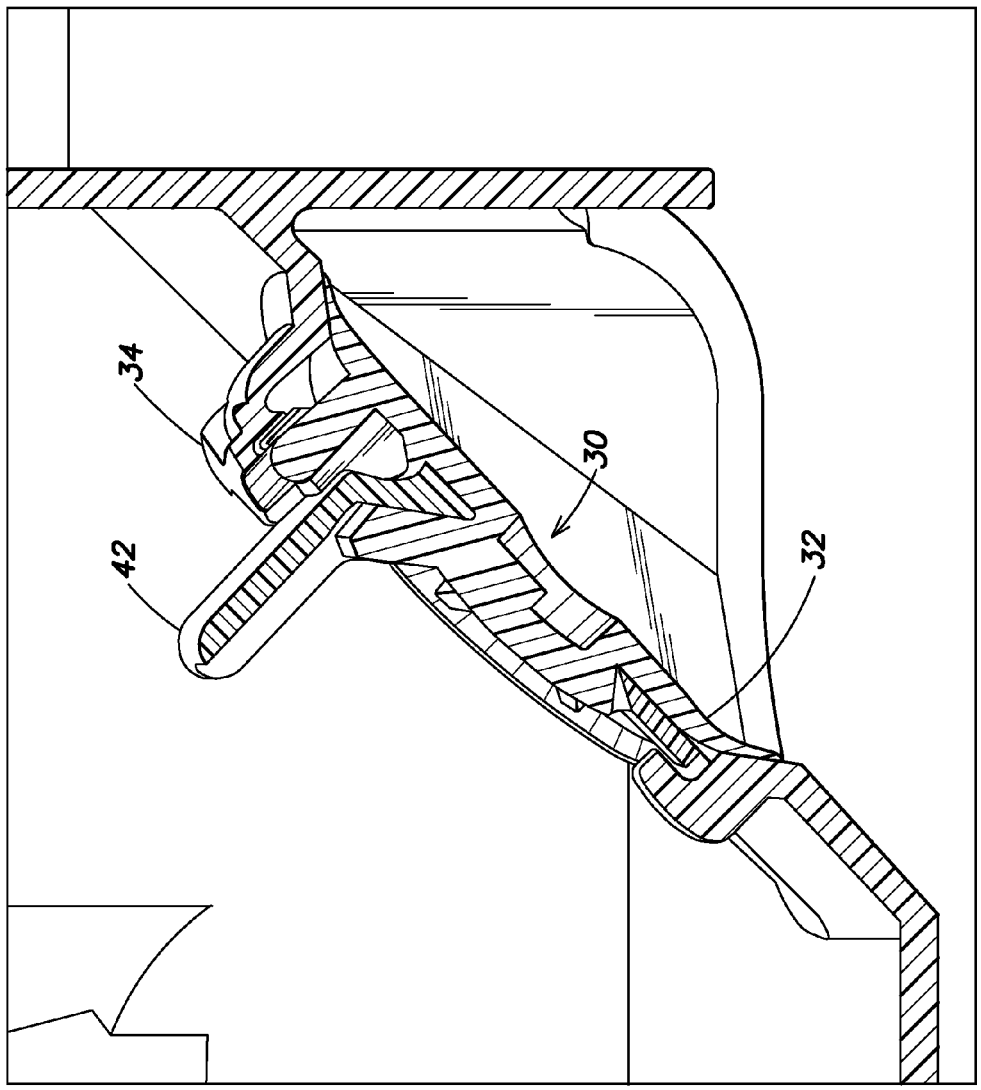
FIG. 8 is a cross sectional view of the self-sealing valve of FIG. 7.
Figure 9:
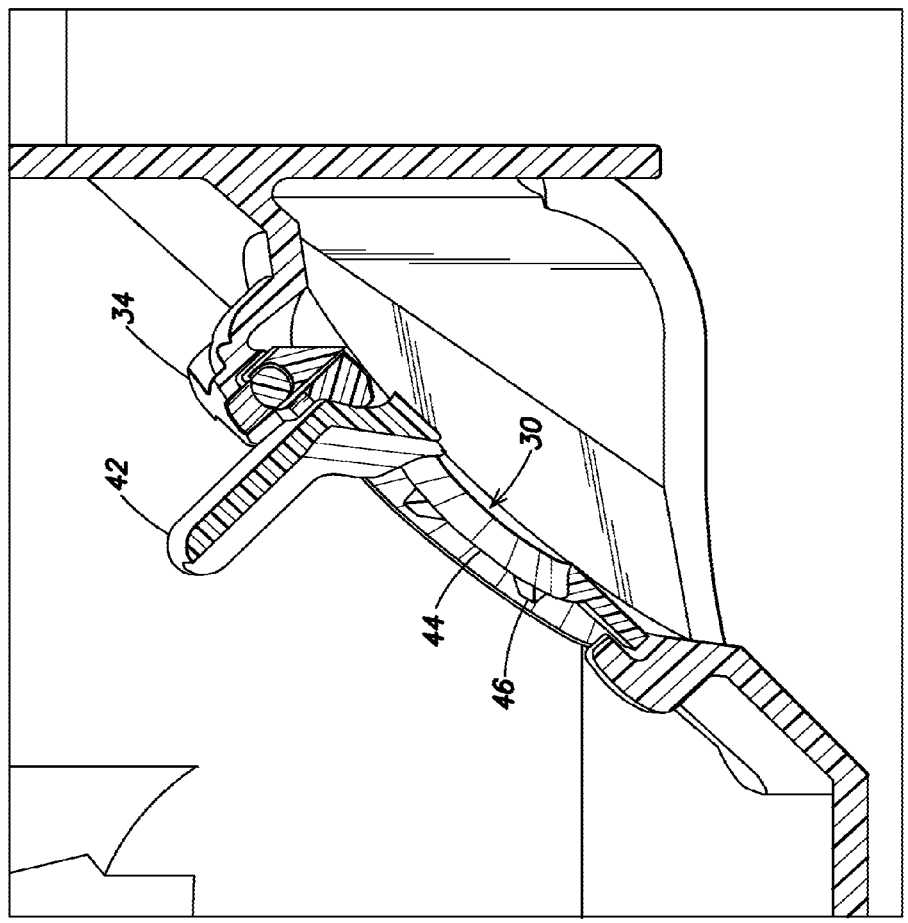
FIG. 9 is a cross sectional view of the self-sealing valve of FIG. 7, without the flexible diaphragm.
Figure 10:
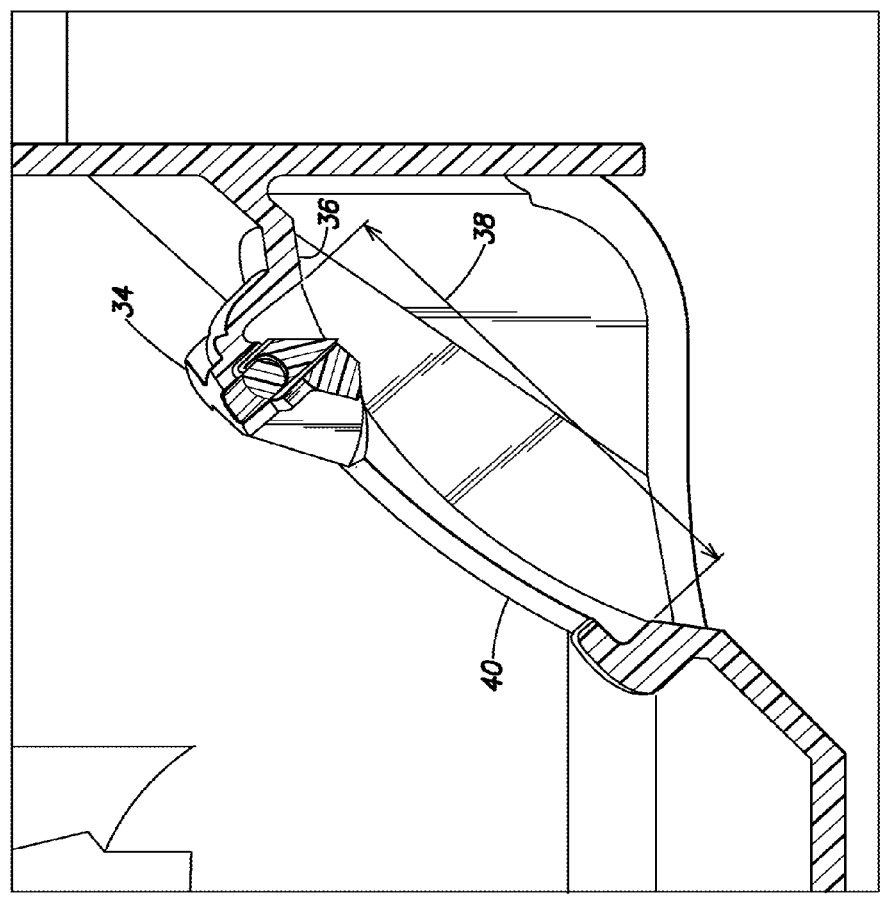
FIG. 10 is a cross sectional view of the self-sealing valve portion of the fluid controller of FIG. 7, without the flexible diaphragm and retaining member.

Referring now to FIG. 3, the fluid controller 10 may be constructed in any manner and using any materials that allow the fluid controller 10 to control the flow of fluid into and/or out of a fluid impermeable bladder 11. According to some embodiments, the fluid impermeable bladder 11 defines at least one chamber 15 capable of retaining fluid within it, for example, pressurized fluid. In one embodiment, the fluid controller 10 includes at least a motor 12, an impeller 14, a self-sealing valve 30, and a valve actuator 70 that allow it to inflate and/or deflate the bladder. For example, as can be seen in the embodiment in FIG. 3, the motor 12 of the fluid controller 10 rotatably drives the impeller 14, which moves a fluid, such as air, into or out of the bladder. A self-sealing valve 30 can be opened to allow fluid to pass into the bladder during the inflation process, and can be closed to prevent the escape of the fluid during use.

It is to be appreciated that the motor 12 may be any device capable of rotating the impeller 14 to induce fluid flow through the fluid controller 10. In one embodiment, the motor 12 is preferably efficient and lightweight. As discussed herein, the motor 12 may be relatively small, to reduce the overall cost of the fluid controller 10, and can be configured to be larger where increased pressurization power or reduced inflation time is desired.

In some embodiments, the motor 12 is an electric motor, and may be powered by any type of voltage, such as alternating current or direct current. For example, the motor 12 may be configured to couple with a domestic electricity source, such as standard house current, through an electrical outlet. In some embodiments where portability is desired, the motor 12 may be powered by batteries, such as commercially-available dry cell batteries, or a vehicle battery via a cigarette lighter. In one embodiment, the fluid controller 10 is constructed to contain one or more batteries to provide electrical power to the motor 12.

In some embodiments, the motor 12 is enclosed within an inner housing 20. The inner housing 20 at least partially surrounds the motor 12, and is substantially impermeable to fluid. The inner housing 20 is constructed to securely contain the motor 12, and may include internal structures such as struts or other mechanisms to maintain the motor 12 in a desired location and orientation while preventing undesired vibration or noise. The inner housing 20 may be constructed in any manner and of any suitable material or materials.

In some embodiments, the fluid controller 10 is enclosed within an outer housing 22. The outer housing 22 at least partially surrounds the components of the fluid controller 10, including the motor 12, the inner housing 20, the impeller 14, the self-sealing valve 30, the valve actuator 70, and any other electronics or other components of the fluid controller 10, thereby enclosing and protecting those components. The outer housing 22 may be constructed in any manner and of any material or materials durable enough to protect the fluid controller 10 in its intended application, and suitable to function as a fluid-impermeable outer wall. For example, the outer housing 22 may be constructed of a lightweight, inexpensive, durable, and fluid-impermeable material. The outer housing 22 may also be shaped such that it is not cumbersome. For example, as seen in FIGS. 1 and 2, the outer housing 22 may be ergonomically designed to form around the fluid controller 10. Materials for construction of the outer housing 22 may include a wide variety of relatively rigid thermoplastics, such as polyvinyl chloride (PVC) or acrylonitrile-butadiene-sytrene (ABS). However, it will be appreciated that the outer housing 22 may also be constructed of other materials, such as metals, metal alloys, and the like.

In some embodiments, for example, as seen in FIG. 1, the outer housing 22 may incorporate a structure for reducing the noise associated with the fluid controller 10, such as a muffler 28. The muffler 28 may be formed of the same or a similar type of thermoplastic as the outer housing 22, and in some embodiments the muffler 28 may further incorporate sound and/or vibration deadening materials on the inside of the fluid controller 10.

Referring again to FIG. 3, the inner housing 20 is constructed to fit within the outer housing 22 so as to form a portion of the fluid conduit 24 therebetween. In one embodiment, the inner housing 20 is constructed such that it is evenly spaced from an inner surface of the outer housing 22. The shapes of the inner housing 20 and the outer housing 22 may be selected to be compatible with one another for purposes of forming the fluid conduit 24. For example, where the inner housing 20 is generally cylindrical, the outer housing 22 may also be generally cylindrical. The outer surface of the inner housing 20 and the inner surface of the outer housing 22 form the walls of the fluid conduit 24, and may be formed in a substantially smooth manner to facilitate unimpeded fluid flow through the fluid conduit 24.

The fluid conduit 24 allows for fluid communication between the inside of the bladder and the external environment, and provides sufficient space for fluid flow therebetween. In some embodiments, the fluid conduit 24 also includes a vane structure 26 to improve the flow of fluid through the fluid conduit 24 and to enhance pressurization. In a preferred embodiment, the vane structure 26 occupies a majority of the fluid conduit 24. For example, the vane structure 26 preferably occupies at least 75% of the length of the fluid conduit 24, even more preferably 90% of the length of the fluid conduit 24, and most preferably substantially all of the length of the fluid conduit 24, thereby improving flow throughout the fluid conduit 24. However, it should be understood that the vane structure 26 need not extend completely through the entire length of the fluid conduit 24.

In some embodiments, the vane structure 26 may be shaped to direct fluid flow within the fluid conduit 24, for example, by forming a bridge from the inner surface of the outer housing 22 to the outer surface of the inner housing 20, forcing fluid to flow through the channels defined by the vane structure 26. However, it should be understood that the vane structure 26 need not extend completely between the inner surface of the outer housing 22 and the outer surface of the inner housing 20.

The vane structure 26 should be constructed to minimize any abrupt changes in fluid flow associated with inefficient flow and decreased pressure. For example, the vane structure 26 may be swept in a direction of the rotation imparted by the impeller 14, and may direct the flow generally axially along the fluid conduit 24. The vane structure 26 is preferably free of any rough edges or dead end pockets that may increase fluid resistance.

It should be appreciated that the vane structure 26 functions optimally in improving the flow of fluid through the fluid conduit 24 and enhancing pressurization in embodiments where the fluid conduit 24 is relatively narrow. For example, where it is desired to make the fluid controller 10 small, yet powerful, it is desirable to make the inner housing 20 relatively large to house a larger motor, while making the outer housing 22 relatively small to reduce the overall size of the fluid controller 10. In such an embodiment, the fluid conduit 24 can be relatively narrow. In some embodiments, the width of the fluid conduit 24 (defined as the average distance between the inner surface of the outer housing 22 and the outer surface of the inner housing 20) may be a small percentage of the average diameter of the outer housing 22. For example, the width of the fluid conduit 24 may be about 25%, more preferably about 10%, even more preferably about 5%, or less of the average diameter of the outer housing 22. In some embodiments, a sufficiently narrow fluid conduit 24 may itself improve fluid flow and pressurization by directing the fluid axially along the fluid conduit 24. Accordingly, in these embodiments a vane structure 26 may not be included.

In some embodiments, the fluid conduit 24 may include one or more structures to maintain the shape of fluid conduit. For example, the fluid conduit 24 may contain structures to secure the inner housing 20 relative to outer housing 22. In one embodiment, these structure may include one or more struts (not shown) for connecting the inner surface of the outer housing 22 to the outer surface of the inner housing 20. In another embodiment, the vane structure 26 provides this structural support.

According to some embodiments, the motor 12 in combination with the impeller 14 provide a pump 13 for moving fluid, for example, air. In further embodiments, other structure included in the fluid controller 10 is included in the pump 13, for example, the inner housing 20 and the vane structure 26. In one embodiment, the pump 13 is an integral unit that is installed in the fluid controller 10 where the pump 13 includes at least the motor 12 and impeller 14 and can also include a motor housing that provides a fluid conduit and/or the vane structure.

Referring still to FIG. 3, the impeller 14 is mechanically coupled to the motor 12. When driven by the motor 12, the impeller 14 rotates to move fluid into and/or out of the bladder by conducting the fluid through the fluid conduit 24.

It is to be appreciated that the impeller 14 may be constructed in any manner and of any material or materials that allow the impeller 14 to move fluid when rotated by the motor 12. For example, the impeller 14 may be constructed with one or more fins 18 capable of inducing fluid into or out of the bladder, depending on the orientation of the fins 18 and the direction of rotation of the impeller 14. The impeller 14 may be constructed of durable and lightweight material that is compatible with the material of the fluid controller 10, such as a thermoplastic.

According to some embodiments, the outer housing 22 provides a wall 23 that defines an interior 25 of the fluid controller 10. In further embodiments, fluid delivered by the pump 13 from ambient can pressurize the interior of the housing 25.

The fluid controller 10 can be connected to the bladder 11 in any manner that allows the fluid controller 10 to supply the bladder with fluid, and inhibit undesired escape of fluid from the bladder. For example, the bladder 11 may be constructed with at least a portion of the fluid controller 10 positioned within the bladder 11 so that the fluid controller 10 will obstruct the use of the bladder or the inflatable device incorporating it.

Figure 15:
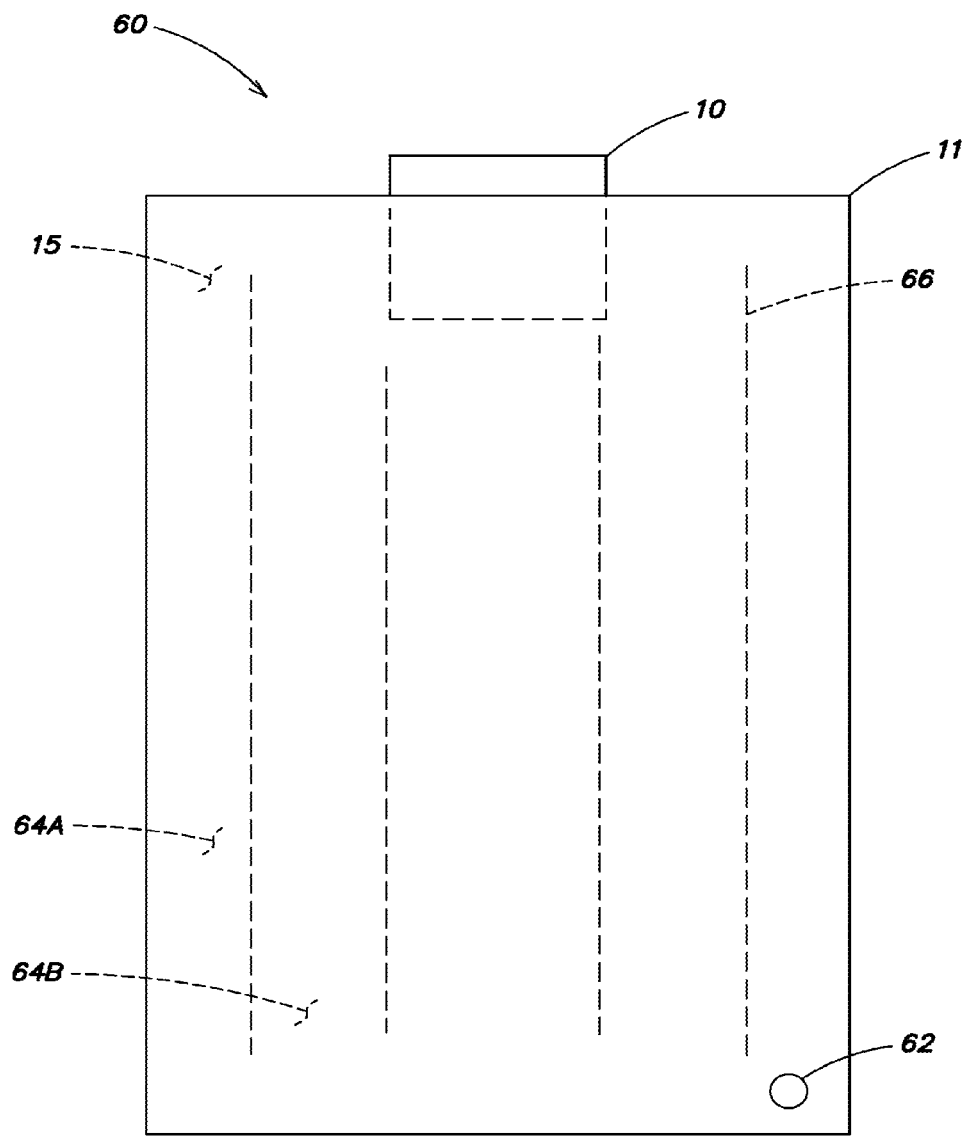
FIG. 15 is a view of an inflatable device in accordance with one embodiment.

Referring now to FIG. 15, an inflatable device 60 is illustrated in accordance with one embodiment. According to the illustrated embodiment, the inflatable device 60 includes the fluid controller 10, and a fluid impermeable bladder 11 that defines a first chamber 15. In accordance with one embodiment, the inflatable device 60 is an inflatable mattress, however, the inflatable device can take the form of any of a variety of inflatable devices configured to employ with a fluid controller 10. In accordance with the illustrated embodiment, the inflatable device 60 also includes an outlet valve 62. It should be apparent that where the fluid controller 10 is configured for both inflation and deflation of the inflatable device 60, the outlet valve 62 may not be included. According to one embodiment, the fluid controller 10 is configured for both inflation and deflation of the first chamber. According to this embodiment, the fluid controller 10 allows a user to release fluid from the chamber 15 for comfort control while the outlet valve 62 is employed as a "dump" valve to provide rapid deflation of the inflatable device 60.

In accordance with the illustrated embodiment, the first chamber 15 is constructed such that all the regions within the fluid impermeable bladder 11 and included in the first chamber 15 are fluidly coupled to one another such that all the regions of the first chamber share the same fluid inlet(s) and fluid outlet(s). In accordance with these embodiments, pressure adjustment of the fluid pressure in the first chamber 15 equally affects all regions of the first chamber 15. That is, the pressure adjustment in any section of chamber 15, for example, the first chamber 15 may include one or more regions 64 which are partially separated from one another by seams, baffles or other structures 66 included in the inflatable device 60. However, such embodiments continue to operate at an equal pressure throughout the first chamber 15 because such structure does not eliminate the fluid coupling and common control for the entirety of the first chamber 15.

In one embodiment, the exterior profile, that is, the total volume and shape, of the fluid controller 10 and the bladder in combination are essentially the same as the exterior profile of the bladder absent the combination. For example, the fluid controller 10 is located substantially within a bladder shaped and sized as a standard-sized mattress so that the fluid controller 10 is within the profile of the bladder, which allows the inflatable mattress to fit into a standard sized bed frame. The fluid controller 10 may be sized and connected to the bladder such that it will not come into contact with the bladder when the bladder is inflated, except at the point of connection between the fluid controller 10 and the bladder.

Where at least a portion of the fluid controller 10 is positioned within the bladder, it may be connected to the bladder in any manner that will not interfere with the use of the bladder or allow undesired escape of fluid from the bladder. For example, the bladder may be adhered or sealed to a portion of the fluid controller 10, such as with an adhesive or heat seal.

The fluid controller 10 may include some structure to facilitate its connection to the bladder. For example, the fluid controller 10 may include a portion adapted to connect to the bladder, such as a flange 48. The flange 48 may, for example, extend from the outer housing 22 or may be a separate component connected to the outer housing 22. The flange 48 may be connected to the outer housing 22 of the fluid controller 10 anywhere and in any manner that allows it to connect the fluid controller 10 and the bladder 11 in a fluid-tight fashion. In some embodiments, the flange 48 may be formed on the outer housing 22, with the two components forming a unitary structure. In other embodiments, the flange 48 may be a separate component.

The flange 48 may be constructed of any material that allows it to durably connect the fluid controller 10 to the bladder in a fluid-tight fashion. For example, the flange 48 may be constructed of a material that is more flexible than the outer housing 22 of the fluid controller, but less flexible than the bladder, bridging the flexibility gap between the two structures and resulting in a durable seal that may be provided, for example, by heat sealing. One example of a suitable material of construction of the flange 48 is PVC. The thickness of the flange 48 may also affect its flexibility, with thinner flanges generally being more flexible than thicker flanges. Thus the thickness of the flange 48 may be selected to provide a desired flexibility with a given material.

The flange 48 may be connected to the outer housing 22 or another portion of the fluid controller 10 in a manner allowing the components to easily be decoupled and recoupled. In some embodiments, the flange 48 may be configured to couple with a portion of the fluid controller 10 through use of a snap, screw, or other manner known in the art. Additional structure may also be included to promote a fluid seal between the flange 48 and the fluid controller 10. For example, a seal, such as an o-ring (not shown), may be placed between the flange 48 and the remainder of the fluid controller 10. In any of these embodiments, the ability to easily decouple the components allows the removal of portions of the fluid controller 10 for repair or replacement, thus preventing the entire inflatable device from having to be disposed of in the event of a failure of one component.

It will be appreciated that the fluid controller 10 may be positioned within the bladder in a variety of ways. For example, the fluid controller 10 and the flange 48 may be configured to position the fluid controller 10 at least partially to almost completely within a wall of the bladder. The size, shape and placement of the flange 48 with respect to the outer housing 22 of the fluid controller 10 may be selected to control how much of the fluid controller 10 is positioned within the bladder. Alternatively, the bladder may include a recess (not shown) and the fluid controller 10 may be positioned within the recess and attached to the recess at an outlet 50 of the fluid controller 10 such that the bladder and the fluid controller 10 are in fluid communication via the outlet 50. The outer housing 22 of the fluid controller 10 may additionally be attached to the recess at other locations within the recess.

Referring still to FIG. 3, the outlet 50 is provided to introduce fluid into the bladder from the fluid controller 10. An inlet 56 may be constructed in any manner to facilitate air flow into the fluid controller 10 from the external environment (i.e., from ambient). In this manner, fluid passes from the external environment through the inlet 56, into the fluid controller 10 and the interior 25 of the housing, through the outlet 50, and into the bladder. In some embodiments, the inlet 56 may include features to prevent foreign objects from being inserted into the fluid controller 10 and contacting the impeller 14. For example, in the illustrated embodiment seen in FIG. 1, the inlet 56 is covered by a grating 58 constructed to have multiple small openings for allowing fluid flow while preventing foreign objects, such as gravel, bedding, or a person's finger, from entering the fluid controller 10 and causing damage to the fluid controller 10 and/or the person operating it.

Referring now to FIGS. 4-11, in one embodiment the fluid controller 10 includes a low-cost, self-sealing valve 30. The self-sealing valve 30 covers the outlet 50, and regulates the flow of fluid into and out of the bladder. The self-sealing valve 30 includes a flexible diaphragm 32, a frame 40, a diaphragm support 34, and a valve seat 36. The flexible diaphragm 32 may be constructed of any material that allows a sufficient seal for a given application. In the illustrated embodiments, it is preferred to be generally circular, deformable, and flexible, and can for example be made of silicone. The diaphragm support 34 maintains a portion of the flexible diaphragm 32 in a fixed position with respect to the valve seat 36 of the self-sealing valve 30 to provide for non-axial movement of the self-sealing valve 30 from a closed position to an open position. The fluid controller 10 further includes a valve actuator 70, which comprises a valve arm 72 having a first position in which the valve arm 72 urges open the self-sealing valve 30 and a second position in which the valve arm 72 allows the self-sealing valve 30 to close.

It is to be appreciated that a preferred pressure operating range of the fluid controller 10 and the self-sealing valve 30 of the present invention is between approximately 0 and 10.0 pounds per square inch (psi). Further, according to the present invention a range of about 0-1.0 psi is defined as a low pressure range, a range of approximately 1.0-2.0 psi is defined as a medium pressure range and a range of approximately 2.0-10.0 psi is defined as a relatively high pressure range. It is to be appreciated that the preferred operating range has been defined to be up to 10.0 psi, but that any pressure above 10.0 psi at which the self-sealing valve 30 and the valve actuator 70 still function for their intended purposes, i.e., to provide a self-seal that is able to be broken by the valve actuator 70, is intended to be within the scope of this invention.

Referring to FIGS. 4-11, the frame 40 of the self-sealing valve 30 has a circular shape, and may be constructed of any suitable material, such as a molded plastic. Preferably the self-sealing valve 30 is constructed of PVC or polyurethane, however, a more rigid and stronger material may be used for higher-pressure applications. The frame 40 defines a fluid path, such as an opening 38, through which a fluid may be transferred, e.g., to provide air to the interior of the bladder, and/or to release air from the interior of the bladder. The opening 38 may also be referred to as a port or an orifice. At its widest point, the opening 38 preferably has a diameter that is about one inch or greater to provide for inflation and deflation of the bladder in a relatively short period of time, such as, for example, in less than two minutes. In one embodiment, the opening 38 is substantially circular and has a diameter of 1.25 inches. The valve seat 36 is formed on the underside of the frame 40. The valve seat 36 is a shaped region around the opening 38 and is configured to mate with the outer periphery of the flexible diaphragm 32 when the self-sealing valve 30 is in a closed position. When the self-sealing valve 30 is in a closed position, the flexible diaphragm 32 engages the valve seat 36 to form a fluid-tight seal.

In some embodiments, different self-sealing valves 30 may each have a frame 40 of a standard size and mounting configuration, whereas the opening 38 of each frame 40 may have a diameter within a particular range depending on the application. For example, each frame 40 may have the same length, width, and mounting hole spacing and configuration, so that each frame can be mounted to span an opening in the fluid controller 10 near the outlet 50. However, each frame 40 may have a different-sized opening 38 and valve seat 36 for receiving different-sized flexible diaphragms 32. This allows for a variety of sizes of self-sealing valves 30 to easily be interchangeably mounted into the fluid controller 10, allowing the fluid controller 10 to be adapted to different uses requiring different-sized valves.

According to some embodiments, the frame 40 includes the diaphragm support 34, which supports retains the flexible diaphragm 32 in a manner that allows the flexible diaphragm 32 to open and close in a non-axial manner such that it seals the opening 38 of the self-sealing valve 30 when closed. By non-axial, it is meant that the diaphragm 32 opens so that a portion of the flexible diaphragm 32 moves away from the valve seat 36, but a portion of the flexible diaphragm 32 remains proximate to the valve seat 36, or in other words in a hinged manner so that only a portion of the flexible diaphragm 32 moves away from the valve seat 36 while a portion of the flexible diaphragm 32 remains proximate to the valve seat 36. Typically, the diaphragm support 34 is constructed from a relatively rigid thermoplastic. This arrangement takes advantage of the resilient properties of the flexible diaphragm 32 to create a spring-like biasing of the self-sealing valve 30, which acts to bias the flexible diaphragm 32 to the closed position absent any force to bias open the flexible diaphragm 32. According to other embodiments, the self-sealing valve is configured to operate in a manner such that the diaphragm 32 moves away from the valve seat 36 for all portions of the valve seat, for example, 360 degrees. In one embodiment, the immediately preceding approach is achieved through a hinged motion of the valve while in another embodiment it is achieved through an axial operation of the valve.

According to one embodiment the wall 23 of the outer housing 22 can define one or a plurality of openings, for example, the opening 38. As described herein, the opening 38 or openings can provide a fluid path between the interior of the housing 25 and the interior of the chamber 15. Further, each opening can define a cross-sectional area of the fluid path. For example, for a circular opening defined by the wall 23 of the outer housing 22 the cross-sectional area of the fluid path is determined as $$\text{Area} = \frac{\pi D^2}{4} \qquad \text{Eq. 1}$$

where D equals the diameter of the opening in the wall 23 of the housing.

According to some embodiments, the frame 40 is an integral part of the outer housing 22, for example, an integral component of the wall 23. In one embodiment, the frame 40 is molded into the outer housing 22. In other embodiments, the frame 40 is a separate component that is attached to the outer housing 22. According to yet other embodiments, a frame 40 is not employed. In any of the preceding embodiments, the valve seat 36 can be formed as a part of the outer housing 22, for example, on an inner or outer face of the wall 23. In some embodiments, the valve seat 36 may also encompass a region 41 of the wall (or the frame) that forms the opening 38. Further, the above approach for determining cross sectional area can be employed where the opening 38 is provided by the wall 23 or another portion of the fluid controller, for example, the frame 40.

It is to be appreciated that the valve actuator 70 can be any mechanism for biasing the flexible diaphragm 32 to the open position. In the illustrated embodiment, the valve arm 72 of the valve actuator 70 has a first position in which the valve arm 72 urges open the self-sealing valve 30 and a second position in which the valve arm 72 allows the self-sealing valve 30 to close. In some embodiments, the valve actuator 70 can be an electromechanical device, for example, a solenoid or electric motor as are known in the art. In these embodiments, the valve actuator 70 may be activated automatically when the motor 12 is engaged or in response to a remote control being manipulated by a user. In other embodiments, the valve actuator 70 may be a manual mechanism that can be manipulated to actuate the valve arm 72 and bias the self-sealing valve 30 to the open position.

Figure 11:
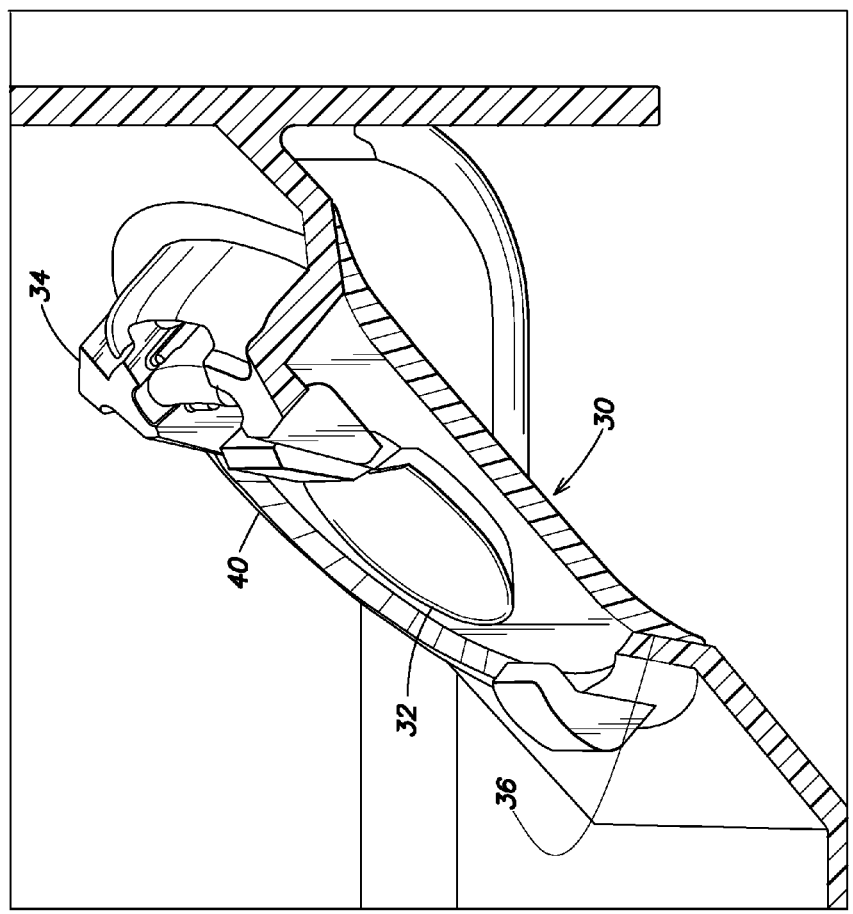
FIG. 11 is a cross sectional view of a self-sealing valve of the fluid controller, according to another embodiment.

In some embodiments, the valve arm 72 contacts and biases the flexible diaphragm 32 directly, as seen for example in FIG. 11. In other embodiments, as seen for example in FIGS. 4-10, the diaphragm support 34 further includes a structure, such as a tab 42, coupled to the flexible diaphragm 32, the tab 42 being configured to move relative to a fixed portion of the diaphragm support 34 in the direction of bias of the flexible diaphragm 32. In these embodiments, the tab 42 engages the valve arm 72, thereby allowing the flexible diaphragm 32 to be biased indirectly. In some embodiments, such as those seen in FIGS. 4-10, the diaphragm support 34 may further include a retaining member 44 for providing further engagement with and support for the flexible diaphragm 32. In one embodiment, the retaining member 44 may further incorporate one or more spokes 46 extending radially from the retaining member 44 across the upper surface of the flexible diaphragm 32. The spokes 46 may provide further leverage and distribute the applied force when the flexible diaphragm 32 is being biased to the open position. In yet other embodiments, such as the one seen in FIG. 11, the retaining member 44 is not included.

In some embodiments, the self-sealing valve 30 is biased to the open position automatically under fluid pressure provided by the motor 12 and impeller 14, allowing fluid to enter the bladder. In the absence of fluid pressure, the resilient nature of the flexible diaphragm 32 causes it to return to the closed position in the same manner described above.

According to some embodiments of the fluid controller 10, the valve actuator 70 is used to bias open the self-sealing valve 30, in order to adjust the level of inflation of the bladder for increased comfort through controlled deflation, or to exhaust the inflatable device. In one embodiment, the fluid controller 10 may further comprise a separate exhaust port so as to exhaust fluid out of the bladder.

According to some embodiments, the self-sealing valve 30 may further comprise a locking tab (not shown) configured to retain the diaphragm 32 in the open position. The locking tab may be further configured such that, when it is contacted, it releases the diaphragm 32 from the open position. For example, the diaphragm 32 may return to the closed position. In one embodiment, the locking tab may be separate from the other components described herein. In another embodiment, the locking tab may be incorporated into the diaphragm support 34 or the retaining member 44.

Figure 12:
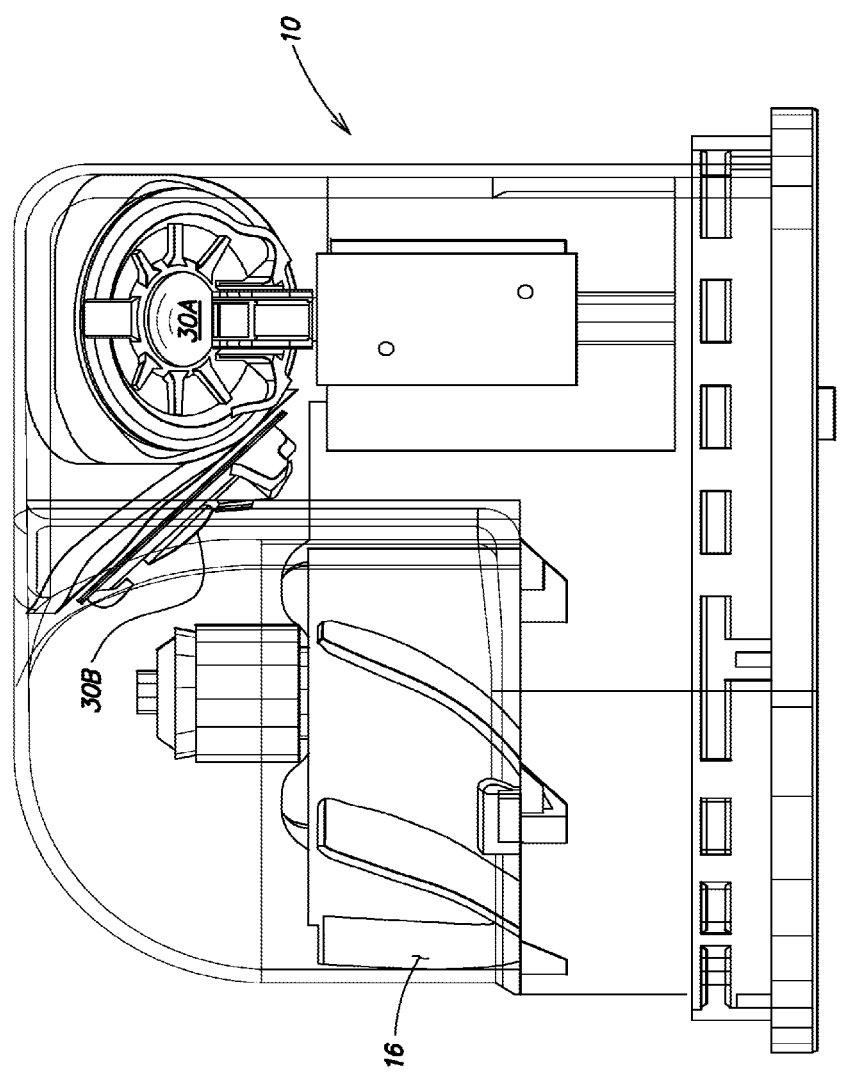
FIG. 12 is a cross sectional view of a fluid controller having two self-sealing valves.
Figure 13:
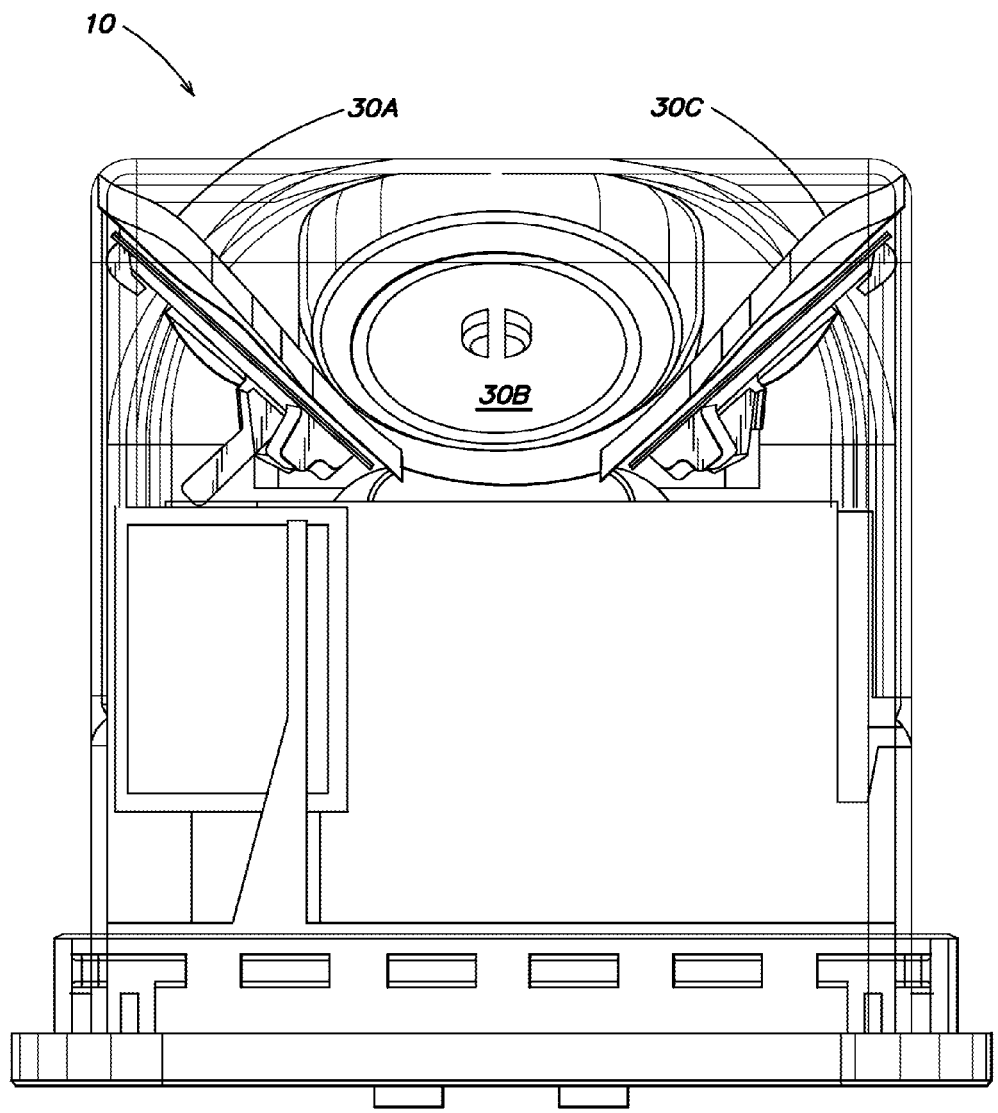
FIG. 13 is a cross sectional view of a fluid controller having three self-sealing valves.

As mentioned above, the fluid impermeable bladder can include a single chamber. In other embodiments, the bladder can include multiple fluidly-isolated single chambers. In still further embodiments, multiple bladders can be used to provide multiple chambers. In any of these embodiments, multiple outlets 50 and multiple self-sealing valves 30 may be included in the fluid controller 10. For example, the fluid controller 10 illustrated in FIG. 15 can include multiple valves when used with the illustrated single-chamber embodiment. Examples of fluid controllers 10 according to these embodiments can be seen in FIGS. 12 and 13. In some embodiments, the fluid controllers in accordance with FIGS. 12 and 13 can be employed to simultaneously inflate several chambers formed from one or multiple bladders. Thus, in some embodiments in which a single chamber is incorporated in an inflatable device, one or a plurality of self-sealing valves 30 may be provided to inflate and/or release air from the single bladder by being configured in fluid communication therewith.

Preferably, the fluid controller 10 is able to inflate the single chamber or multiple chambers in a relatively short time period, such as in less than a minute to two minutes for an inflatable mattress. According to some embodiments, the fluid controller 10 includes a plurality of valves employed during inflation of the chamber 15 to increase the rate of fluid transfer and the corresponding pressurization of the chamber 15 (for example, to increase the fill rate of the chamber). According to one embodiment, the fluid controller 10 is configured to receive one of a range of motors having different sizes in order to achieve a desired pumping time for a bladder having a particular size. The fluid controller 10 may further include mounting brackets and other adapters for receiving different-sized motors and/or different-sized impellers. In this manner, different motors and impellers may be interchangeably mounted into the fluid controller 10 for a variety of applications.

Figure 14:
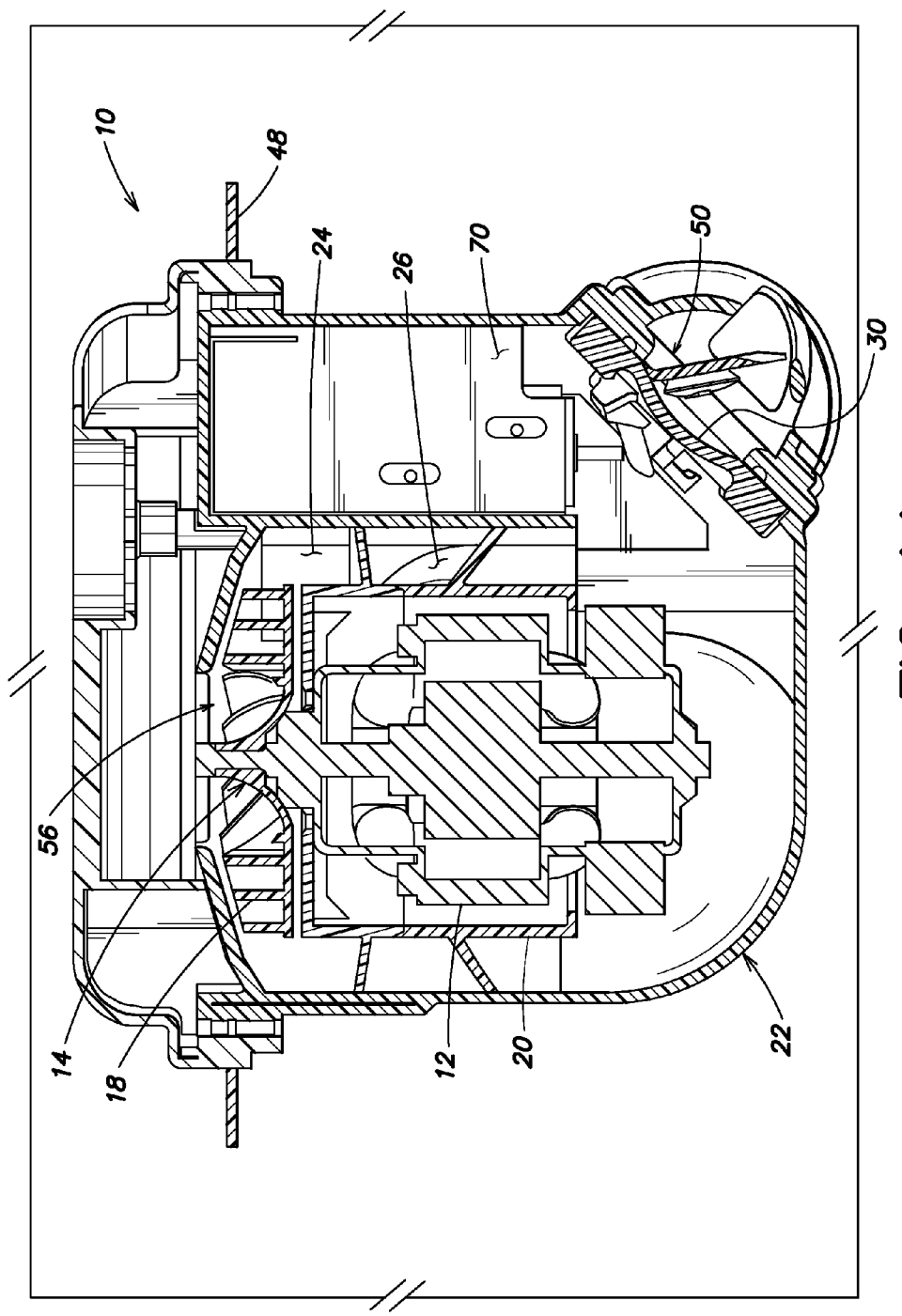
FIG. 14 is a cross sectional view of the fluid controller including the self-sealing valve and valve actuator, according to another embodiment.

For example, as can be seen in FIG. 14, in some embodiments the motor 12 and the impeller 14 may be configured to be relatively small in size to require as little electrical energy as possible to operate the pump 13. For example, low power consumption is particularly desirable where the fluid controller 10 is to be powered by batteries, as it may extend battery life. The fluid controller 10 may also be configured to be quiet in operation. A balance of pumping capacity, size, power consumption, noise generation and cost may be selected for a particular application as will be recognized by those of skill in the art.

The fluid controller 10 may be operated by any conventional control mechanism, such a conventional power switch. The fluid controller 10 may also include a remote control structure for controlling the fluid controller 10, which can for example be a wireless or a wired remote controller (not shown). The remote control device may be separate from or separable from the fluid controller 10. In one embodiment, the remote control device is a hand-held device.

The remote control device may include a mechanism for controlling the operation of fluid controller. For example, the remote control device may include a conventional power switch that, when manipulated, causes energy to be provided or not provided to the fluid controller 10. The switch may be any of the many well-known mechanisms for selectively connecting two conductors to supplying electricity to a point of use. The remote control device may also include a mechanism that directs the deflation of the bladder. For example, the remote control device may include a second switch that may act upon the valve actuator 70 to open the self-sealing valve 30 and allow selective deflation of the bladder.

Figure 16:
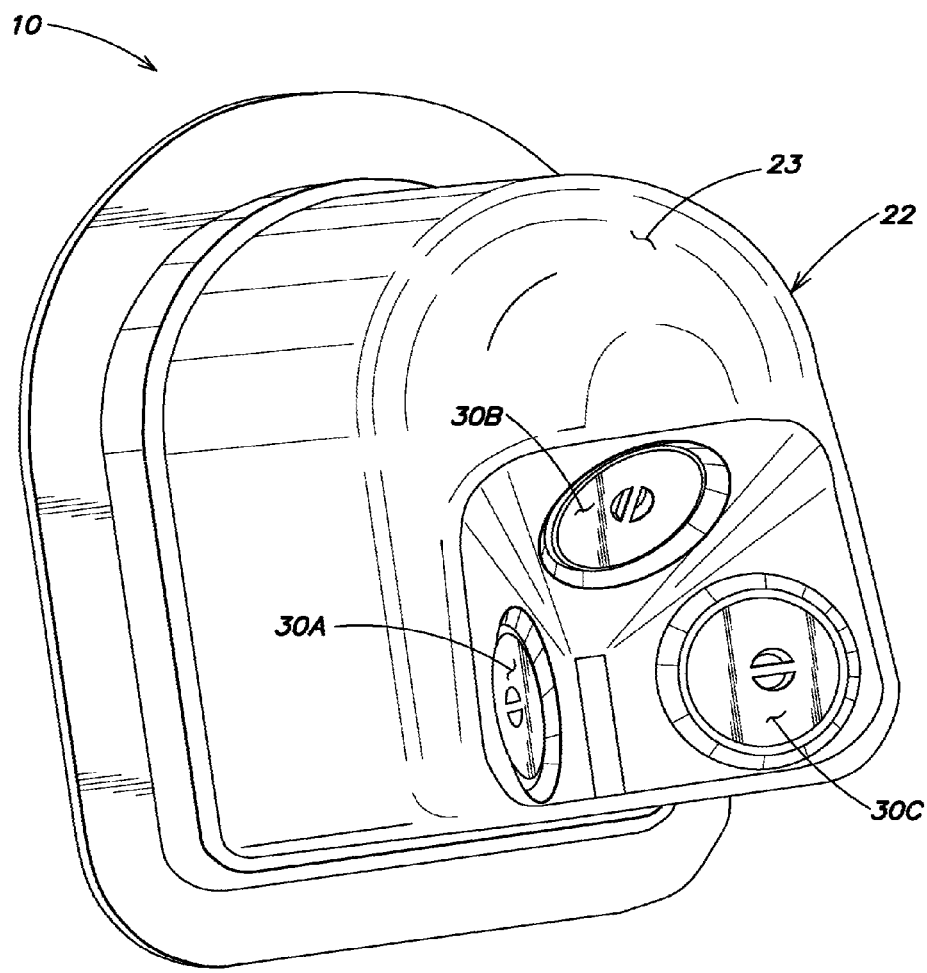
FIG. 16 is a perspective view of a fluid controller in accordance with one embodiment.
Figure 17:
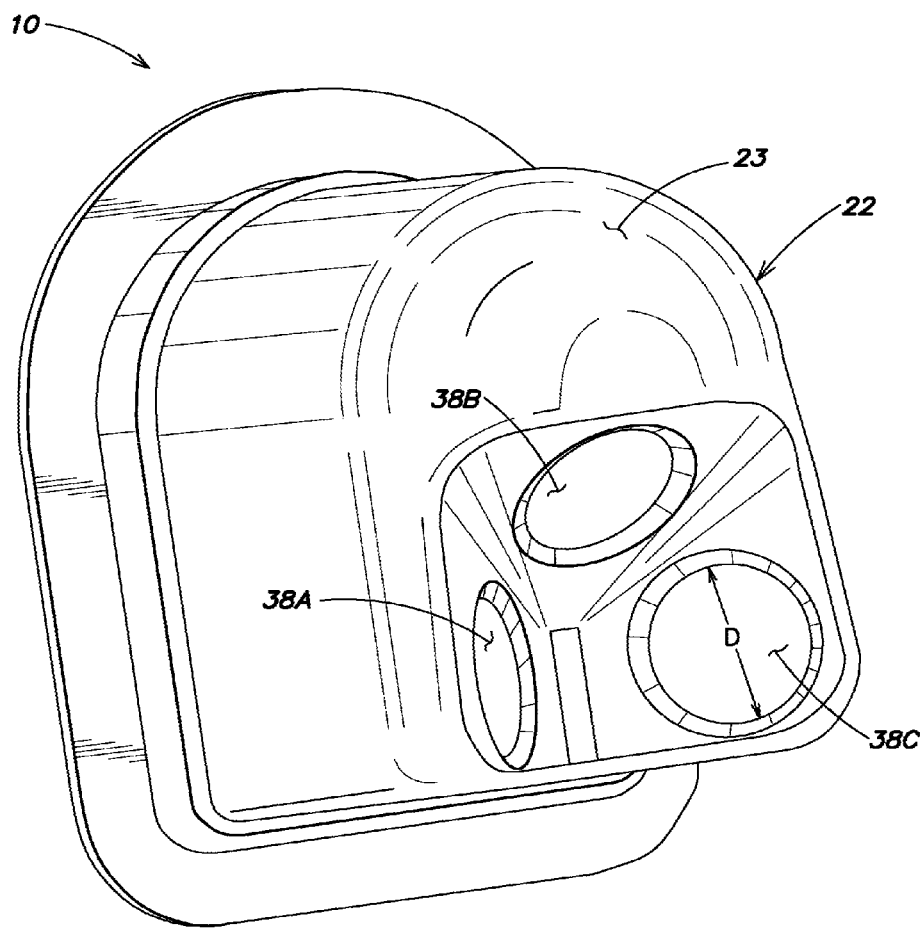
FIG. 17 is a perspective view of the fluid controller of FIG. 16 with the valve diaphragms removed.
Figure 18:
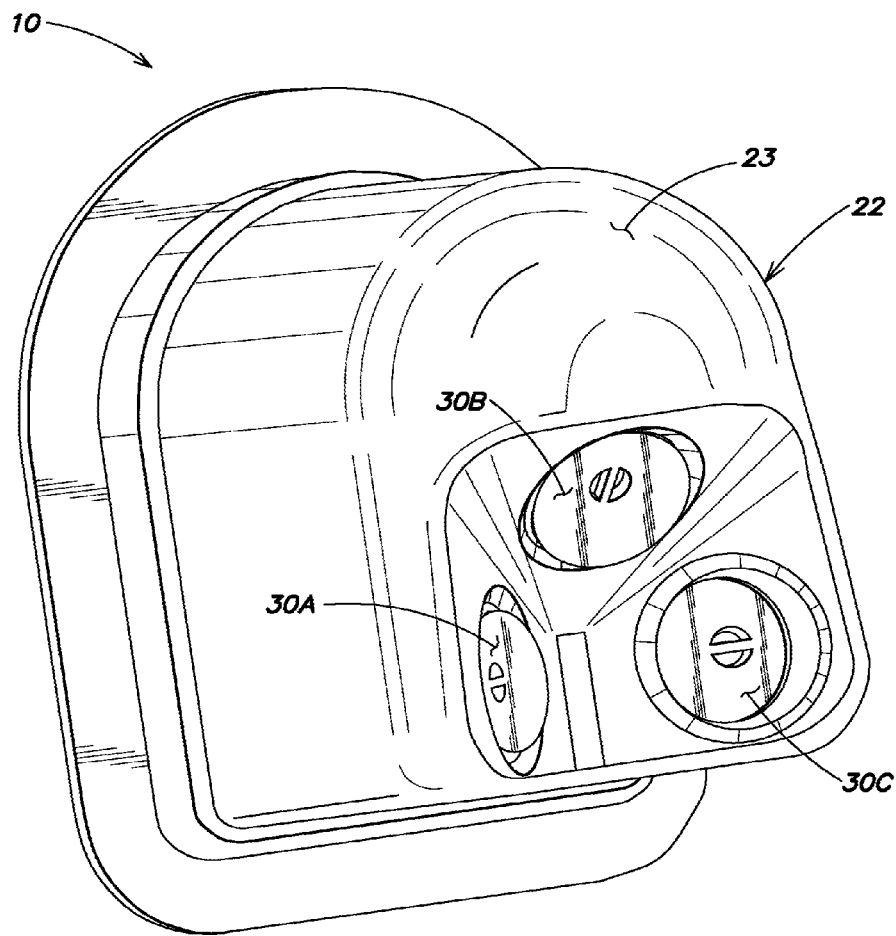
FIG. 18 is a perspective view of a fluid controller of FIG. 16 during inflation.
Figure 19:
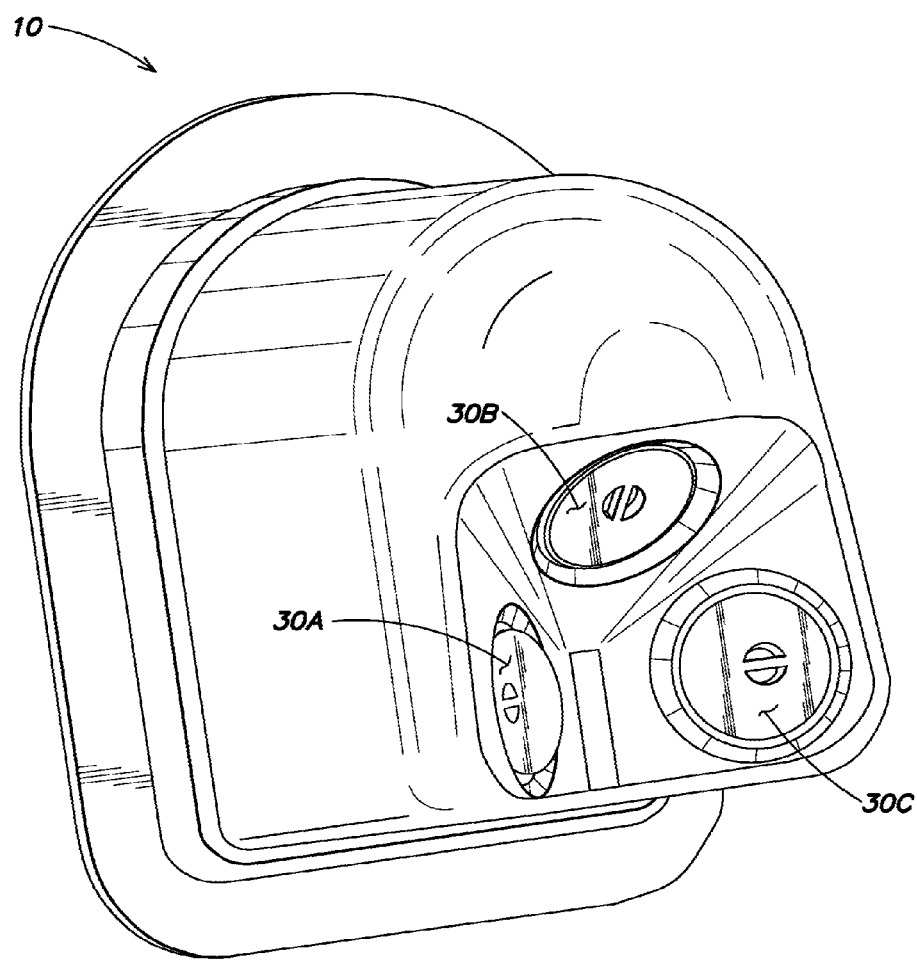
FIG. 19 is a perspective view of the fluid controller of FIG. 16 during deflation.

Referring now to FIG. 16, a fluid controller 10 is illustrated in accordance with a further embodiment. Further, each of FIGS. 17, 18 and 19 illustrate the fluid controller 10 to further describe various features and embodiments of the controller. In some embodiments, the fluid controller 10 is employed with an inflatable device that includes a single chamber, for example, the inflatable device 60 as illustrated in FIG. 15. Further, although the inflatable device of FIG. 15 illustrates a mattress, the fluid controller 10 can be employed with a wide variety of inflatable devices. In general, the fluid controller 10 operates to provide a more rapid inflation of the inflatable device with which it is used by allowing a plurality of valves 30A, 30B, 30C to operate during inflation. Further, in some embodiments, the fluid controller 10 illustrated in FIGS. 16-19 operates to provide a first fluid path from the interior of the housing 25 to within the chamber 15 during inflation and a second fluid path from within the chamber 15 to the interior of the housing during deflation.

According to one embodiment, a cross-sectional area of the first fluid path differs from a cross-sectional area of the second fluid path. In some of these embodiments, the cross-sectional area of the first fluid path is greater than the cross-sectional area of the second fluid path to provide for a greater rate of fluid transmission during inflation relative to the rate of fluid transmission during deflation. In some embodiments, the size of the cross-sectional area of the first fluid path is substantially greater than the cross-sectional area of the second fluid path. Such an approach can provide for a substantially shorter inflation cycle by increasing the fill rate of the chamber 15. This approach is particularly advantageous where the chamber has a relatively large volume, for example, as used with today's larger inflatable mattresses. In some embodiments, the increased opening employed during inflation can decrease inflation time by a factor of three (for example, from 3 minutes to 1 minute).

The fluid controller 10 of FIG. 16 has a general construction as previously illustrated and described herein, for example, the fluid controller 10 includes an outer housing 22 that includes a wall 23 and a plurality of valves 30A, 30B, 30C. FIG. 16 illustrates a fluid controller 10 which includes a total of N valves and a total of N openings associated with a corresponding one of the N valves, respectively, where N is greater than 1. Referring now to FIG. 17, the fluid controller is illustrated with the diaphragm of the self-sealing valves remove to illustrate the openings 38A, 38B, 38C. Further, each of the opening 38A, 38B, 38C has a diameter D illustrated, for example, in the opening 38C of FIG. 17 where the diameter may be the same or may vary from among the openings. According to some embodiments, each of the openings 38A, 38B, 38C provide a fluid path from an interior of fluid controller 10 to an interior of the chamber 15 defined by the fluid impermeable bladder. Where the fluid controller 10 includes a total of N openings, for example, 38A, 38B, 38C, operation of all the corresponding valves allows fluid to move through all three openings to substantially increase the cross-sectional area of the fluid path defined by the housing. Accordingly, because operation of a plurality of the valves 30A, 30B, 30C during inflation provides a larger fluid path such an approach can allow the fluid controller 10 to more rapidly fill the volume defined by the chamber 15 with fluid to pressurize the inflatable device 60 for use.

According to one embodiment, at least two of the plurality of self sealing valves 30A, 30B, 30C open when the fluid controller 10 is employed to add fluid to the chamber 15. According to another embodiment, where the fluid controller 10 includes a plurality of valves (a quantity of N valves, where N is greater than 1), all of the N valves included in the fluid controller 10 are employed during deflation and N−1 or fewer valves are employed during deflation using the fluid controller 10. The preceding approach can be employed to provide a ratio of a total cross-sectional area of the fluid path from the interior of the fluid controller to the chamber during inflation to the total cross-sectional area of the fluid path from the interior of the fluid controller to the chamber during deflation, where the ratio is substantially greater than 1. Referring to the fluid controller illustrated in FIGS. 16-19, three openings 38A, 38B, 38C having an identical diameter D can be employed together during inflation to provide a total cross-sectional area of 3D while a single valve can be employed during deflation to provide a total cross-sectional area of D resulting in a ratio of 3:1. Other configurations can be employed, for example, the illustrated fluid controller can employ two valves during inflation and a single valve during deflation to provide a ratio of 2:1. In a further embodiment, the fluid controller can employ three valves during inflation and two valves during deflation to provide a ratio of 3:2.

The openings 38A, 38B, 38C need not have the same diameter and fluid controllers including openings having dimensions that differ from one another can be employed. Further, the fluid controller 10 can employ any number of valves and corresponding openings where the total N of each of the preceding is at least two. The maximum number of valves can be determined for a particular application based on, for example, the available area provided by the outer housing 22, and the diameter of the valves that are commonly available. An advantage of using the same or similarly dimensioned opening is that a single model/size diaphragm can be employed in combination with each opening.

Referring now to FIG. 18, fluid controller is shown in an embodiment where the diaphragms 30A, 30B, 30C have moved to an open position when the pump 13 included in the fluid controller 10 is operated to provide fluid to the interior of the outer housing 22 to lift the diaphragms off their associated valve seats 36, respectively. Thus, according to this embodiment, multiple valves are employed during inflation to allow a greater volume of fluid to be moved from, for example, ambient through the openings 38A, 38B, 38C and into the interior of the chamber 15. Although FIG. 18 illustrates an embodiment in which three self-sealing valves are employed during inflation, other embodiments may employ any number greater than one during inflation. So, for example, a fluid controller 10 equipped with two or more valves may employ at least two of the valves during inflation and in some embodiments, employ all of a total of N valves included in the fluid controller to maximize the cross sectional area of the fluid path from the pump 13 to the interior 15 of the chamber.

According to the embodiment illustrated in FIG. 19, deflation can be accomplished via operation of a single valve included in the fluid controller 10. As previously described, operation of the valve (or valves) for deflation can be accomplished via a valve actuator including electromechanical means, purely mechanical means or including each type of operation. For example, a motor or solenoid can be used to open a valve, for example, the valve 30A to allow a comfort control by releasing fluid from within the chamber and to ambient via the fluid controller 10. According to further embodiments, fluid controller 10 can provide a power-deflate operation in which a pump is operated in reverse rotation to remove fluid from within the chamber to ambient via the fluid controller. According to this embodiment, the valve 30A is electromechanically operated. In addition to the fluid controller, the inflatable device can include an outlet valve, for example, the outlet valve 62 illustrated in FIG. 15 by which a user can manually but rapidly deflate an inflatable device at the end of its use. Further, the valve 30A can solely be a manually operated valve where the fluid controller 10 includes an adjustment mechanism (such as a mechanical linkage) from an exposed (i.e., user accessible) portion of the fluid controller to the self sealing valve. According to a further embodiment, the adjustment can also be accomplished with an electromechanical operator such as a solenoid.

Embodiments of the fluid controller 10 described herein can be employed with inflatable devices that include a single chamber or multiple chambers. Examples include layered devices in which all regions are fluidly coupled such that independent pressure adjustment for separate layers is unavailable (i.e., the multiple layers form a single chamber). Other examples include multi-chamber devices, for example, a queen-size inflatable mattress that includes side by side chambers for independent comfort control of the chambers relative to one another. According to some multi-chamber embodiments, the fluid controller includes a plurality of valves where at least two valves are employed for inflation of each chamber, respectively. For example, the fluid controller 10 can include a total of six valves where a first plurality of three valves are fluidly coupled to a first chamber and a second plurality of three different valves are coupled to a second chamber included in the inflatable device. According to this example, all of the first plurality of valves are employed during inflation of the first chamber and at least one of the first plurality of valves is employed during deflation of the first chamber. Further, all of the second plurality of valves are employed during inflation of the second chamber and at least one of the second plurality of valves is employed during deflation of the second chamber.

The preceding defines a fluid path as an opening 38 between the interior of the fluid controller 25 and the chamber 15, and further describes the area (i.e., dimensions) of the fluid path as the area of the opening (for example, an area of the fluid path can be defined as the area of the opening 38 in the wall 23 of the outer housing 22). Alternatively, the area of the fluid path for the embodiments described herein can be defined as the area of the opening that is clear of the diaphragm when the self sealing valve is open.

Thus, other embodiments can include a fluid controller with a single valve that operates to provide a ratio of a total cross-sectional area of the fluid path from the interior of the fluid controller to the chamber during deflation to the total cross-sectional area of the fluid path from the interior of the fluid controller to the chamber during inflation, where the ratio is substantially greater than 1. Such an embodiment, can, for example, be achieved where a flexible diaphragm is opened partly during deflation and more fully opened during inflation. In addition, in such embodiments, the fluid path is provided by the combination of the diaphragm and the opening. That is, the area of the fluid path is provided by the cross-sectional area of the opening (for example, the opening 38) which is exposed when the valve is open for inflation and deflation, respectively.

Further, although the embodiments illustrated herein depict a fluid controller that is at least partially recessed within a profile of the inflatable bladder with which it is employed, the fluid controller 10 need not be recessed and can be employed in other configurations where, for example, all of the fluid controller 10 is located external to the profile of the bladder of the inflatable device with which it is used, or the majority of the fluid controller 10 is located external to the profile of the bladder.

In addition, some embodiments can provide a greater rate of fluid transfer during deflation than inflation using the fluid controller 10. According to one embodiment, the fluid controller provides a ratio of a total cross-sectional area of the fluid path from the interior of the fluid controller to the chamber during deflation to the total cross-sectional area of the fluid path from the interior of the fluid controller to the chamber during inflation, where the ratio is substantially greater than 1. Such an embodiment can be advantageously employed where suited for a particular application.

Having thus described certain embodiments of the inflatable device of the application, various alterations, modifications and improvements will be apparent to those of ordinary skill in the art. Such alterations, variations and improvements are intended to be within the spirit and scope of the application. Accordingly, the foregoing description is by way of example and is not intended to be limiting. The application is limited only as defined in the following claims and the equivalents thereto.

What is claimed is:

1. A fluid controller configured to supply fluid to an inflatable bladder comprising a chamber, the fluid controller comprising:
   a housing comprising a wall separating an interior of the housing from the inflatable bladder, the wall including a plurality of orifices, each orifice configured to be sealed by one of a respective plurality of valves;
   a pump located at least partly within an interior of the housing and configured to provide fluid to the chamber; and
   each valve of the plurality of valves fluidly coupling the interior of the housing to the chamber through a respective orifice;
   wherein the plurality of valves and respective orifices are biased open by fluid from the pump to provide a fluid path between the interior of the housing and the chamber during inflation of the chamber, and the plurality of valves are configured to simultaneously inflate the chamber;
   wherein a valve and respective orifice is urged open to provide a fluid path between the interior of the housing and the chamber for fluid release; and
   wherein the valve and respective orifice employed to release fluid from the chamber is one of the plurality of valves and respective orifices employed during inflation of the chamber.

2. The fluid controller of claim 1, wherein at least three valves and respective orifices are employed during inflation of the chamber.

3. The fluid controller as claimed in claim 1, wherein the housing is at least partly recessed within a wall of the inflatable bladder.

4. The fluid controller of claim 3, wherein the inflatable bladder is included in a mattress.

5. The fluid controller of claim 1, further comprising at least one valve actuator configured to open the at least one valve.

6. The fluid controller of claim 5, wherein the valve actuator is configured to be manually operated to actuate the valve open.

7. The fluid controller of claim 5, wherein the valve actuator is configured to be electrically operated to actuate the valve open.

8. The fluid controller of claim 1, wherein a total cross-sectional area provided by the plurality of valves and respective orifices during inflation is greater than a total cross-sectional area provided by the valve and respective orifice during deflation.

9. The fluid controller of claim 1, wherein the pump and the plurality of valves are configured such that during inflation of the chamber the plurality of valves are biased open solely by fluid pressure provided by the pump to provide a fluid path between the interior of the housing and the chamber through the plurality of valves and respective orifices.

10. The fluid controller of claim 1, wherein a single valve and orifice is employed for fluid release.

11. The fluid controller of claim 1, wherein each of the valves is a self sealing valve having a flexible diaphragm.

12. A fluid controller configured to adjust fluid pressure in an inflatable bladder comprising a chamber, the fluid controller comprising:
   a housing comprising a wall separating an interior of the housing from the inflatable bladder, the wall including a plurality of openings, each openings configured to be sealed by one of a respective plurality of valves;
   a pump located at least partly within an interior of the housing and configured to provide fluid to the chamber; and
   each valve of the plurality of valves fluidly coupling the interior of the housing to the chamber through a respective opening;
   wherein each opening defines a cross-sectional area of a fluid pathway from the interior of the housing to the chamber, respectively, and
   wherein the fluid controller is configured such that a total cross-sectional area provided by at least one valve and corresponding opening during inflation is greater than a total cross-sectional area provided by at least one valve and corresponding opening during deflation.

13. The fluid controller of claim 12, wherein the total cross-sectional area provided during inflation is at least twice the total cross-sectional area provided during deflation.

14. The fluid controller of claim 13, wherein the at least one opening provided during inflation includes at least two openings and respective valves.

15. The fluid controller of claim 13, wherein a ratio of the total cross-sectional area provided during inflation to the total cross-sectional area provided during deflation is substantially 2:1.

16. The fluid controller of claim 12, wherein at least two valves are biased open during an inflation of the chamber by the fluid provided by the pump.

17. The fluid controller of claim 16, wherein at least one of the plurality of valves is biased open with a valve actuator during deflation of the chamber.

18. The fluid controller of claim 12, wherein each of the valves includes a self sealing valve having a flexible diaphragm.

19. The fluid controller as claimed in claim 12, wherein the housing is at least partly recessed within a wall of the inflatable bladder.

20. A fluid controller configured to supply fluid to an inflatable bladder comprising a chamber, the fluid controller comprising:
   a housing comprising a wall separating an interior of the housing from the inflatable bladder, the wall including a plurality of openings, each openings configured to be sealed by one of a respective plurality of valves;
   a pump located at least partly within an interior of the housing and configured to provide fluid to the chamber; and
   each valve of the plurality of valves fluidly coupling the interior of the housing to the chamber through a respective opening; and
   wherein the pump and the plurality of valves are configured such that during inflation of the chamber the plurality of valves are biased open solely by fluid pressure provided by the pump to provide a fluid path between the interior of the housing and the chamber through the plurality of valves and respective openings.

* * * * *